US011903887B2

(12) United States Patent
Bekoscke

(10) Patent No.: US 11,903,887 B2
(45) Date of Patent: Feb. 20, 2024

(54) WHEELCHAIR AND SUSPENSION SYSTEMS

(71) Applicant: INVACARE CORPORATION, Elyria, OH (US)

(72) Inventor: Robert Bekoscke, Medina, OH (US)

(73) Assignee: INVACARE CORPORATION, Elyria, OH (US)

( * ) Notice: Subject to any disclaimer, the term of this patent is extended or adjusted under 35 U.S.C. 154(b) by 403 days.

(21) Appl. No.: 17/179,466

(22) Filed: Feb. 19, 2021

(65) Prior Publication Data

US 2021/0259898 A1 Aug. 26, 2021

Related U.S. Application Data

(60) Provisional application No. 62/981,265, filed on Feb. 25, 2020.

(51) Int. Cl.
*A61G 5/10* (2006.01)

(52) U.S. Cl.
CPC .......... *A61G 5/1078* (2016.11); *A61G 5/1089* (2016.11)

(58) Field of Classification Search
CPC .......................... A61G 5/1078; A61G 5/1089
See application file for complete search history.

(56) References Cited

U.S. PATENT DOCUMENTS

| X865514 | 9/1907 | Mullenmeister |
| 1,116,086 A | 11/1914 | Lewis |
| 1,151,414 A | 8/1915 | Steinbach |
| 1,773,254 A | 9/1930 | Becker |
| 1,973,627 A | 9/1934 | Harter |
| 2,398,211 A | 4/1946 | du Pont |
| 2,427,482 A | 9/1947 | Wiessman |
| 2,767,995 A | 10/1956 | Stout |
| 2,949,153 A | 8/1960 | Hickman |
| 2,986,200 A | 5/1961 | Nobile |
| 3,104,112 A | 9/1963 | Crail |
| 3,174,176 A | 3/1965 | Olson |
| 3,191,990 A | 6/1965 | Rugg et al. |

(Continued)

FOREIGN PATENT DOCUMENTS

| CA | 2254372 | 5/2000 |
| CN | 1138825 A | 12/1996 |

(Continued)

OTHER PUBLICATIONS

Notice of Allowance from U.S. Appl. No. 12/330,554 dated Nov. 15, 2011.

(Continued)

*Primary Examiner* — Kevin Hurley
(74) *Attorney, Agent, or Firm* — Calfee, Halter & Griswold LLP

(57) ABSTRACT

Embodiments of a wheelchair and suspension system are provided. The suspension includes a drive assembly that is pivotably connected to a base frame at multiple locations. In one embodiment, the connection is via intermediary pivoting links or arms. Embodiments of the links or arms including rigid links, resilient links, elastic links, shocks, springs, gas cylinders and lockable gas cylinders (or combinations of the foregoing). The drive assembly can, via the pivot connections, pivot to accommodate and traverse variations and obstacles on ground surfaces.

18 Claims, 14 Drawing Sheets

(56) References Cited

U.S. PATENT DOCUMENTS

| | | |
|---|---|---|
| 3,195,670 A | 7/1965 | Dunn |
| 3,210,092 A | 10/1965 | Kraus et al. |
| 3,282,605 A | 11/1966 | Nihlean et al. |
| 3,314,672 A | 4/1967 | Persson |
| 3,506,079 A | 4/1970 | Madler et al. |
| 3,573,877 A | 4/1971 | Locke |
| 3,580,591 A | 5/1971 | Coffey |
| 3,589,700 A | 6/1971 | Ruet et al. |
| 3,592,282 A | 7/1971 | Soileau |
| 3,602,522 A | 8/1971 | Zamotin |
| 3,618,968 A | 11/1971 | Greer |
| 3,627,157 A | 12/1971 | Blatchly |
| 3,661,228 A | 5/1972 | Glasser |
| 3,664,450 A | 5/1972 | Udden et al. |
| 3,682,462 A | 8/1972 | Papousek |
| 3,689,103 A | 9/1972 | Meulendyk |
| 3,709,313 A | 1/1973 | James |
| 3,709,517 A | 1/1973 | Nossner |
| 3,848,883 A | 11/1974 | Breacain |
| 3,862,751 A | 1/1975 | Schwaller |
| 3,876,012 A | 4/1975 | Regier |
| 3,881,773 A | 5/1975 | Rodaway |
| 3,883,153 A | 5/1975 | Singh et al. |
| 3,893,529 A | 7/1975 | Karchak, Jr. et al. |
| 3,901,337 A | 8/1975 | Cragg |
| 3,901,527 A | 8/1975 | Danziger et al. |
| 3,905,437 A | 9/1975 | Kaiho et al. |
| 3,917,312 A | 11/1975 | Rodaway |
| 3,930,551 A | 1/1976 | Cragg |
| 3,952,822 A | 4/1976 | Udden et al. |
| 3,953,054 A | 4/1976 | Udden et al. |
| 3,976,152 A | 8/1976 | Bell |
| 4,078,817 A | 3/1978 | Ferguson et al. |
| 4,108,449 A | 8/1978 | Rhodes |
| 4,118,020 A | 10/1978 | Myers |
| 4,119,163 A | 10/1978 | Ball |
| 4,128,137 A | 12/1978 | Booth |
| 4,190,263 A | 2/1980 | Powers |
| 4,222,449 A | 9/1980 | Feliz |
| 4,245,847 A | 1/1981 | Knott |
| 4,247,125 A | 1/1981 | Rayment |
| 4,264,085 A | 4/1981 | Volin |
| 4,310,167 A | 1/1982 | McLaurin |
| 4,333,681 A | 6/1982 | Nelson |
| 4,337,958 A | 7/1982 | Witt et al. |
| 4,341,278 A | 7/1982 | Meyer |
| 4,375,295 A | 3/1983 | Volin |
| 4,387,325 A | 6/1983 | Klimo |
| 4,405,142 A | 9/1983 | Whetstine |
| 4,436,320 A | 3/1984 | Brudermann et al. |
| 4,437,678 A | 3/1984 | Schultz |
| 4,455,029 A | 6/1984 | Taylor |
| 4,455,031 A | 6/1984 | Hosaka |
| 4,456,295 A | 6/1984 | Francu |
| 4,483,407 A | 11/1984 | Iwamoto et al. |
| 4,500,102 A | 2/1985 | Haury et al. |
| 4,513,832 A | 4/1985 | Engman |
| 4,515,385 A | 5/1985 | Christian |
| 4,542,918 A | 9/1985 | Singleton |
| 4,545,593 A | 10/1985 | Farnam |
| 4,545,616 A | 10/1985 | Booth |
| 4,556,229 A | 12/1985 | Bihler et al. |
| 4,565,385 A | 1/1986 | Morford |
| 4,592,570 A | 6/1986 | Nassiri |
| RE32,242 E | 9/1986 | Minnebraker |
| 4,614,246 A | 9/1986 | Masse et al. |
| 4,618,155 A | 10/1986 | Jayne |
| 4,641,848 A | 2/1987 | Ayers |
| 4,655,471 A | 4/1987 | Peek |
| 4,687,068 A | 8/1987 | Pagett |
| 4,720,223 A | 1/1988 | Neights et al. |
| 4,721,321 A | 1/1988 | Haury et al. |
| 4,721,322 A | 1/1988 | Hawkins |
| 4,730,842 A | 3/1988 | Summers et al. |
| 4,736,983 A | 4/1988 | Furbee |
| 4,759,418 A | 7/1988 | Goldenfeld et al. |
| 4,763,910 A | 8/1988 | Brandli et al. |
| 4,805,712 A | 2/1989 | Singleton |
| 4,805,925 A | 2/1989 | Haury et al. |
| 4,811,966 A | 3/1989 | Singleton |
| 4,823,900 A | 4/1989 | Farnam |
| 4,826,194 A | 5/1989 | Sakita |
| 4,840,394 A | 6/1989 | Bickler |
| 4,861,056 A | 8/1989 | Duffy, Jr. et al. |
| 4,862,983 A | 9/1989 | Kreft |
| 4,886,294 A | 12/1989 | Nahachewski |
| 4,905,972 A | 3/1990 | Scowen |
| 4,919,441 A | 4/1990 | Marier et al. |
| 4,926,952 A | 5/1990 | Farman |
| 4,934,626 A | 6/1990 | Kimura |
| 4,951,766 A | 8/1990 | Basedow et al. |
| 4,962,942 A | 10/1990 | Barnett et al. |
| 4,967,864 A | 11/1990 | Boyer et al. |
| 4,989,890 A | 2/1991 | Lockard et al. |
| 5,020,816 A | 6/1991 | Mulholland |
| 5,042,607 A | 8/1991 | Falkenson et al. |
| 5,044,647 A | 9/1991 | Patterson |
| 5,044,648 A | 9/1991 | Knapp |
| 5,076,390 A | 12/1991 | Haskins |
| 5,076,602 A | 12/1991 | Robertson et al. |
| 5,113,959 A | 5/1992 | Mastov et al. |
| 5,123,495 A | 6/1992 | Littlejohn et al. |
| 5,125,468 A | 6/1992 | Coker |
| 5,137,295 A | 8/1992 | Peek |
| 5,156,226 A | 10/1992 | Boyer et al. |
| 5,176,393 A | 1/1993 | Robertson et al. |
| 5,180,025 A | 1/1993 | Yeh et al. |
| 5,180,275 A | 1/1993 | Czech et al. |
| 5,181,133 A | 1/1993 | Lipton |
| 5,181,733 A | 1/1993 | Tague |
| 5,183,133 A | 2/1993 | Roy et al. |
| 5,197,559 A | 3/1993 | Garin, III et al. |
| 5,203,610 A | 4/1993 | Miller |
| 5,209,322 A | 5/1993 | Mcmahon |
| 5,209,509 A | 5/1993 | Gay et al. |
| 5,222,567 A | 6/1993 | Broadhead et al. |
| 5,228,709 A | 7/1993 | Kao |
| 5,230,522 A | 7/1993 | Gehlsen et al. |
| 5,241,876 A | 9/1993 | Mathis |
| 5,248,007 A | 9/1993 | Watkins et al. |
| 5,290,055 A | 3/1994 | Treat, Jr. |
| 5,294,141 A | 3/1994 | Mentessi et al. |
| 5,297,021 A | 3/1994 | Koerlin et al. |
| 5,301,964 A | 4/1994 | Papac |
| 5,316,328 A | 5/1994 | Bussinger |
| 5,341,533 A | 8/1994 | Seitz |
| 5,351,774 A | 10/1994 | Okamoto |
| 5,366,037 A | 11/1994 | Richey |
| 5,372,211 A | 12/1994 | Wilcox et al. |
| 5,403,031 A | 4/1995 | Gottschalk et al. |
| 5,419,571 A | 5/1995 | Vaughan |
| 5,435,404 A | 7/1995 | Garin, III |
| 5,447,317 A | 9/1995 | Gehlsen et al. |
| 5,464,271 A | 11/1995 | McFarland |
| 5,467,838 A | 11/1995 | Wu |
| 5,482,261 A | 1/1996 | Ortega |
| 5,485,140 A | 1/1996 | Bussin |
| 5,489,139 A | 2/1996 | McFarland |
| 5,513,875 A | 5/1996 | Tahara et al. |
| 5,518,081 A | 5/1996 | Thibodeau |
| 5,531,284 A | 7/1996 | Okamoto |
| 5,540,297 A | 7/1996 | Meier |
| 5,562,172 A | 10/1996 | Mick |
| 5,564,512 A | 10/1996 | Scheulderman |
| 5,575,348 A | 11/1996 | Goertzen et al. |
| 5,611,555 A | 3/1997 | Vidal |
| 5,628,377 A | 5/1997 | LaGloan |
| 5,701,122 A | 12/1997 | Canedy |
| 5,727,802 A | 3/1998 | Garven, Jr. et al. |
| 5,727,809 A | 3/1998 | Ordelman et al. |
| 5,762,155 A | 6/1998 | Scheulderman |
| 5,772,048 A | 6/1998 | Sopcisak |
| 5,772,226 A | 6/1998 | Bobichon |
| 5,772,237 A | 6/1998 | Finch et al. |

(56) References Cited

U.S. PATENT DOCUMENTS

| | | |
|---|---|---|
| D397,645 S | 9/1998 | Schaffner |
| 5,833,248 A | 11/1998 | Eguchi |
| 5,848,658 A * | 12/1998 | Pulver .................. B60G 15/06 |
| | | 180/907 |
| 5,851,018 A | 12/1998 | Curran et al. |
| 5,851,019 A | 12/1998 | Gill et al. |
| 5,853,059 A | 12/1998 | Goertzen et al. |
| D404,693 S | 1/1999 | Schaffner et al. |
| 5,855,387 A | 1/1999 | Gill et al. |
| 5,899,475 A | 5/1999 | Verhaeg et al. |
| 5,904,214 A | 5/1999 | Lin |
| 5,921,532 A | 7/1999 | Pierce et al. |
| 5,944,131 A | 8/1999 | Schaffner et al. |
| 5,954,351 A | 9/1999 | Koschinat |
| 5,957,474 A | 9/1999 | Mundy et al. |
| 5,964,473 A | 10/1999 | Degonda et al. |
| 5,988,304 A | 11/1999 | Behrents |
| 5,996,716 A | 12/1999 | Montiglio et al. |
| 6,003,624 A | 12/1999 | Jorgensen et al. |
| 6,029,763 A | 2/2000 | Swisher |
| 6,041,876 A | 3/2000 | Pulver et al. |
| 6,047,979 A | 4/2000 | Kraft et al. |
| 6,062,600 A | 5/2000 | Kamen et al. |
| 6,068,280 A | 5/2000 | Torres |
| 6,070,898 A | 6/2000 | Dickie et al. |
| 6,073,951 A | 6/2000 | Jindra et al. |
| 6,076,619 A | 6/2000 | Hammer |
| 6,079,698 A | 6/2000 | Patterson et al. |
| 6,079,725 A | 6/2000 | Lazaros |
| D429,665 S | 8/2000 | Dickie |
| 6,095,271 A | 8/2000 | Dickie et al. |
| 6,129,165 A | 10/2000 | Schaffner et al. |
| 6,131,679 A | 10/2000 | Pulver et al. |
| 6,131,940 A * | 10/2000 | Arnoth .................. A61G 5/107 |
| | | 297/39 |
| 6,135,222 A | 10/2000 | Furukawa |
| 6,161,856 A | 12/2000 | Peterson |
| 6,168,178 B1 | 1/2001 | Garven, Jr. et al. |
| 6,176,335 B1 | 1/2001 | Schaffner et al. |
| 6,179,076 B1 | 1/2001 | Fernie et al. |
| 6,186,252 B1 | 2/2001 | Schaffner et al. |
| 6,196,343 B1 | 3/2001 | Strautnieks |
| 6,199,647 B1 | 3/2001 | Schaffner et al. |
| 6,206,119 B1 | 3/2001 | Wu |
| 6,209,670 B1 | 4/2001 | Fernie et al. |
| 6,217,114 B1 | 4/2001 | Degonda |
| 6,225,894 B1 | 5/2001 | Kyrtsos |
| 6,234,263 B1 | 5/2001 | Boivin et al. |
| 6,234,507 B1 | 5/2001 | Dickie et al. |
| 6,241,275 B1 | 6/2001 | Slagerman |
| 6,264,218 B1 | 7/2001 | Slagerman |
| 6,279,927 B1 | 8/2001 | Nishihira et al. |
| 6,312,000 B1 | 11/2001 | Pauls et al. |
| 6,322,089 B1 | 11/2001 | Dantele et al. |
| 6,341,657 B1 | 1/2002 | Hopely et al. |
| 6,341,671 B1 | 1/2002 | Ebersole |
| 6,347,688 B1 | 2/2002 | Hall et al. |
| 6,357,793 B1 | 3/2002 | Dickie et al. |
| 6,375,209 B1 | 4/2002 | Schlangen |
| 6,394,738 B1 | 5/2002 | Springer |
| 6,405,816 B1 | 6/2002 | Kamen et al. |
| 6,412,804 B1 | 7/2002 | Dignat |
| 6,425,597 B1 | 7/2002 | Peterson |
| 6,428,020 B1 | 8/2002 | Steadman |
| 6,428,029 B1 | 8/2002 | Barclay |
| 6,429,541 B2 | 8/2002 | Takenaka et al. |
| 6,454,286 B1 | 9/2002 | Hosino |
| 6,460,641 B1 | 10/2002 | Kral |
| 6,460,869 B1 | 10/2002 | Tremouilles |
| 6,494,474 B1 | 12/2002 | Kramer, Jr. |
| 6,533,305 B1 | 3/2003 | Falk |
| 6,533,306 B2 | 3/2003 | Watkins |
| 6,543,564 B1 | 4/2003 | Kamen et al. |
| 6,543,798 B2 | 4/2003 | Schaffner et al. |
| 6,554,086 B1 | 4/2003 | Goertzen et al. |
| 6,568,030 B1 | 5/2003 | Watanabe et al. |
| 6,581,711 B1 | 6/2003 | Tuluie |
| 6,588,799 B1 | 7/2003 | Sanchez |
| 6,601,863 B1 | 8/2003 | Mentessi et al. |
| 6,640,916 B2 | 11/2003 | Schaffner et al. |
| 6,684,969 B1 | 2/2004 | Flowers et al. |
| 6,688,437 B2 | 2/2004 | Usherovich |
| 6,702,306 B1 | 3/2004 | Ockwell |
| 6,712,369 B2 | 3/2004 | Wu |
| 6,715,845 B2 | 4/2004 | Kamen et al. |
| D491,115 S | 6/2004 | Taylor |
| 6,776,430 B2 | 8/2004 | White et al. |
| 6,851,711 B2 | 2/2005 | Goertzen et al. |
| 6,857,490 B2 | 2/2005 | Quigg |
| 6,923,278 B2 | 8/2005 | Mulhern et al. |
| 6,923,280 B2 | 8/2005 | Goertzen et al. |
| 6,935,448 B2 | 8/2005 | Goertzen et al. |
| 6,938,923 B2 | 9/2005 | Mulhern et al. |
| 7,021,641 B2 | 4/2006 | Wu |
| 7,040,429 B2 | 5/2006 | Molnar et al. |
| 7,055,634 B2 | 6/2006 | Molnar |
| 7,066,290 B2 | 6/2006 | Fought |
| 7,083,195 B2 | 8/2006 | Goertzen et al. |
| 7,100,716 B2 | 9/2006 | Engels et al. |
| 7,150,463 B1 | 12/2006 | Liao |
| 7,175,193 B2 | 2/2007 | Wu |
| 7,219,755 B2 | 5/2007 | Goertzen et al. |
| 7,219,924 B2 | 5/2007 | Mulhern et al. |
| 7,232,008 B2 | 6/2007 | Levi et al. |
| 7,234,554 B2 | 6/2007 | Mulhern et al. |
| 7,264,272 B2 | 9/2007 | Mulhern et al. |
| 7,273,118 B2 | 9/2007 | Huang |
| 7,293,801 B2 | 11/2007 | Bertrand et al. |
| 7,316,282 B2 | 1/2008 | Mulhern et al. |
| 7,370,876 B2 | 5/2008 | Hsu et al. |
| 7,374,002 B2 | 5/2008 | Fought |
| 7,380,824 B2 * | 6/2008 | Chen .................. B60B 33/045 |
| | | 280/755 |
| 7,389,835 B2 | 6/2008 | Mulhern et al. |
| 7,398,842 B2 | 7/2008 | Fontecchio et al. |
| 7,413,038 B2 | 8/2008 | Mulhern et al. |
| 7,461,897 B2 | 12/2008 | Kruse et al. |
| 7,472,767 B2 | 1/2009 | Molnar |
| 7,490,683 B2 | 2/2009 | Schaffner |
| 7,506,709 B2 | 3/2009 | Kiwak et al. |
| 7,516,984 B2 | 4/2009 | Tang |
| 7,556,109 B2 | 7/2009 | Chen et al. |
| 7,597,163 B2 | 10/2009 | Goertzen et al. |
| 7,735,591 B2 | 6/2010 | Puskar-Pasewicz et al. |
| 7,766,106 B2 | 8/2010 | Puskar-Pasewicz et al. |
| 7,775,307 B2 | 8/2010 | Cheng |
| 7,828,310 B2 | 11/2010 | Vreeswijk et al. |
| D632,229 S | 2/2011 | Kruse |
| 7,882,909 B2 | 2/2011 | Pearlman et al. |
| 7,896,394 B2 | 3/2011 | Jackson et al. |
| 8,037,953 B2 | 10/2011 | Puskar-Pasewicz et al. |
| 8,113,531 B2 | 2/2012 | Zhou |
| 8,118,321 B2 * | 2/2012 | Hunziker ................ A61G 5/14 |
| | | 280/304.2 |
| 8,172,015 B2 | 5/2012 | Molnar |
| 8,172,016 B2 | 5/2012 | Goertzen et al. |
| 8,177,257 B2 | 5/2012 | Dugas et al. |
| 8,186,463 B2 | 5/2012 | Hunziker et al. |
| 8,210,556 B2 | 7/2012 | Zhou et al. |
| 8,272,461 B2 | 9/2012 | Bekoscke et al. |
| 8,286,738 B2 | 10/2012 | Cheng |
| 8,297,388 B2 | 10/2012 | Indenkamp et al. |
| 8,534,679 B2 | 9/2013 | Goertzen et al. |
| 8,573,341 B2 | 11/2013 | Fought et al. |
| 8,636,089 B2 | 1/2014 | Goertzen et al. |
| 8,794,359 B2 | 8/2014 | Bekoske |
| 8,833,774 B2 | 9/2014 | Goertzen et al. |
| 8,910,975 B2 | 12/2014 | Bekoscke et al. |
| 8,925,943 B2 | 1/2015 | Molnar |
| 9,010,470 B2 | 4/2015 | Cuson et al. |
| 9,022,400 B2 | 5/2015 | Porcheron |
| 9,149,398 B2 | 10/2015 | Goertzen et al. |
| 9,308,143 B2 | 4/2016 | Bekoscke |
| 9,346,335 B2 | 5/2016 | Bekoscke et al. |

(56) References Cited

U.S. PATENT DOCUMENTS

| | | |
|---|---|---|
| 9,351,889 B2 | 5/2016 | Mulhern |
| 9,358,165 B2 | 6/2016 | Wu |
| 9,364,377 B2 | 6/2016 | Goertzen et al. |
| 9,370,455 B2 | 6/2016 | Molnar |
| 9,603,762 B2 | 3/2017 | Bekoscke |
| 9,700,470 B2 | 7/2017 | Bekoscke et al. |
| 9,827,823 B2 | 11/2017 | Bekoscke et al. |
| 9,913,768 B2 | 3/2018 | Cuson et al. |
| 9,925,100 B2 | 3/2018 | Goertzen et al. |
| 9,987,177 B2 | 6/2018 | Goertzen et al. |
| 10,226,392 B2 | 3/2019 | Chiang |
| 10,265,229 B2 | 4/2019 | Bekoscke et al. |
| 10,335,330 B2 | 7/2019 | Omer |
| 10,434,019 B2 | 10/2019 | Bekoscke et al. |
| 10,512,572 B2 | 12/2019 | Goertzen et al. |
| 10,532,626 B2 | 1/2020 | Bekoscke et al. |
| 10,912,690 B2 | 2/2021 | Bekoscke et al. |
| 11,452,648 B2 | 9/2022 | Batke |
| 2001/0011613 A1 | 8/2001 | Schaffner et al. |
| 2001/0013437 A1 | 8/2001 | Husted et al. |
| 2002/0023787 A1 | 2/2002 | Kamen et al. |
| 2002/0088657 A1 | 7/2002 | Brett et al. |
| 2002/0175027 A1 | 11/2002 | Usherovich |
| 2003/0030243 A1 | 2/2003 | Engels |
| 2003/0075365 A1 | 4/2003 | Fought |
| 2003/0122332 A1 | 7/2003 | Engels et al. |
| 2003/0168264 A1 | 9/2003 | Goertzen et al. |
| 2003/0168265 A1 | 9/2003 | Goertzen et al. |
| 2003/0201632 A1 | 10/2003 | Mulhern et al. |
| 2003/0205420 A1 | 11/2003 | Mulhern et al. |
| 2004/0004342 A1 | 1/2004 | Mulhern et al. |
| 2004/0032119 A1 | 2/2004 | Tran et al. |
| 2004/0060748 A1 | 4/2004 | Molnar |
| 2004/0084230 A1 | 5/2004 | Grymko et al. |
| 2004/0094944 A1 | 5/2004 | Goertzen et al. |
| 2004/0144580 A1 | 7/2004 | Wu |
| 2004/0150204 A1 | 8/2004 | Goertzen et al. |
| 2004/0159476 A1 | 8/2004 | Molnar |
| 2004/0168839 A1 | 9/2004 | Wu |
| 2004/0188152 A1 | 9/2004 | Schaffner |
| 2004/0232683 A1 | 11/2004 | Mulhern |
| 2004/0262859 A1 | 12/2004 | Turturiello |
| 2005/0034903 A1 | 2/2005 | Wu |
| 2005/0077694 A1 | 4/2005 | Levi et al. |
| 2005/0077714 A1 | 4/2005 | Mulhern et al. |
| 2005/0077715 A1 | 4/2005 | Mulhern et al. |
| 2005/0127631 A1 | 6/2005 | Schaffner |
| 2005/0151360 A1 | 7/2005 | Bertrand et al. |
| 2005/0206124 A1 | 9/2005 | Levi |
| 2005/0206149 A1* | 9/2005 | Mulhern .............. A61G 5/1078 280/755 |
| 2005/0225040 A1 | 10/2005 | Goertzen et al. |
| 2005/0225041 A1 | 10/2005 | Longino |
| 2006/0021806 A1 | 2/2006 | Goertzen et al. |
| 2006/0022445 A1 | 2/2006 | Mulhern |
| 2006/0076747 A1 | 4/2006 | Pauls et al. |
| 2006/0076748 A1 | 4/2006 | Pauls et al. |
| 2006/0082117 A1 | 4/2006 | Turturiello |
| 2006/0086554 A1 | 4/2006 | Jackson et al. |
| 2006/0201723 A1 | 9/2006 | Hsu et al. |
| 2006/0213705 A1 | 9/2006 | Molnar |
| 2006/0244249 A1 | 11/2006 | Goertzen et al. |
| 2006/0249317 A1 | 11/2006 | Fought |
| 2006/0255581 A1 | 11/2006 | Goertzen et al. |
| 2006/0266565 A1 | 11/2006 | Fontecchio et al. |
| 2007/0018418 A1 | 1/2007 | Huang |
| 2007/0023209 A1 | 2/2007 | Wu |
| 2007/0039766 A1 | 2/2007 | Jackson et al. |
| 2007/0080003 A1 | 4/2007 | Koerlin et al. |
| 2007/0095582 A1 | 5/2007 | Stuijt et al. |
| 2007/0107955 A1 | 5/2007 | Puskar-Pasewicz et al. |
| 2007/0181353 A1 | 8/2007 | Puskar-Pasewicz et al. |
| 2007/0209845 A1 | 9/2007 | Chen et al. |
| 2007/0209848 A1 | 9/2007 | Tang |
| 2008/0053720 A1 | 3/2008 | Chen et al. |
| 2008/0083573 A1 | 4/2008 | Tseng |
| 2008/0087481 A1 | 4/2008 | Grymko et al. |
| 2008/0157513 A1 | 7/2008 | Cheng |
| 2008/0208394 A1 | 8/2008 | Fought |
| 2009/0091092 A1 | 4/2009 | Molnar |
| 2009/0121532 A1 | 5/2009 | Kruse et al. |
| 2009/0145677 A1 | 6/2009 | Zhou |
| 2009/0295119 A1 | 12/2009 | Bloswich |
| 2010/0004820 A1 | 1/2010 | Bekoscke et al. |
| 2010/0013172 A1 | 1/2010 | Goertzen |
| 2010/0065346 A1 | 3/2010 | Porcheron |
| 2010/0084209 A1 | 4/2010 | Bekoscke et al. |
| 2010/0102529 A1 | 4/2010 | Lindenkamp et al. |
| 2010/0301576 A1 | 12/2010 | Dugas et al. |
| 2011/0083913 A1 | 4/2011 | Cuson et al. |
| 2011/0215540 A1 | 9/2011 | Hunziker |
| 2012/0012416 A1 | 1/2012 | Mirzaie |
| 2012/0217070 A1 | 8/2012 | Goertzen |
| 2012/0217713 A1 | 8/2012 | Molnar |
| 2012/0299262 A1 | 11/2012 | Bekoscke |
| 2013/0207364 A1 | 8/2013 | Bekoscke et al. |
| 2013/0328282 A1* | 12/2013 | Porcheron .............. A61G 5/1078 280/124.104 |
| 2015/0196438 A1 | 7/2015 | Mulhern |
| 2016/0287456 A1 | 10/2016 | Bekoske |
| 2016/0318367 A1 | 11/2016 | Bekoske |
| 2018/0028379 A1 | 2/2018 | Bekoske |
| 2018/0214325 A1 | 8/2018 | Van de Wal et al. |
| 2018/0360678 A1 | 12/2018 | Cuson et al. |
| 2019/0046373 A1 | 2/2019 | Coulter |
| 2020/0155387 A1 | 5/2020 | Bekoske |
| 2020/0206047 A1 | 7/2020 | Bekoske |
| 2020/0276065 A1 | 9/2020 | Mulhern |

FOREIGN PATENT DOCUMENTS

| | | |
|---|---|---|
| CN | 1839779 | 10/2006 |
| CN | 101636139 A | 1/2010 |
| DE | 152186 | 9/1903 |
| DE | 2256934 | 5/1973 |
| DE | 1399822 | 8/1977 |
| DE | 69519943 | 8/2001 |
| DE | 19806500 | 3/2002 |
| DE | 10136368 | 5/2003 |
| DE | 10136369 | 5/2003 |
| EP | 18101 | 10/1980 |
| EP | 127929 | 12/1984 |
| EP | 268960 | 6/1988 |
| EP | 312969 | 4/1989 |
| EP | 339500 | 11/1989 |
| EP | 369791 | 5/1990 |
| EP | 419085 | 3/1991 |
| EP | 445171 | 9/1991 |
| EP | 511113 | 10/1992 |
| EP | 677285 | 10/1995 |
| EP | 702945 | 3/1996 |
| EP | 829247 | 3/1998 |
| EP | 841052 | 5/1998 |
| EP | 908165 | 4/1999 |
| EP | 908166 | 4/1999 |
| EP | 927551 | 7/1999 |
| EP | 988848 | 3/2000 |
| EP | 1118531 | 7/2001 |
| EP | 1118531 A1 | 7/2001 |
| EP | 1147969 | 10/2001 |
| EP | 1279391 | 1/2003 |
| EP | 1279392 | 1/2003 |
| EP | 1434545 | 7/2004 |
| EP | 1479362 | 11/2004 |
| EP | 1493418 | 1/2005 |
| EP | 1513479 | 3/2005 |
| EP | 1522292 | 4/2005 |
| EP | 1522295 | 4/2005 |
| EP | 1582189 | 10/2005 |
| EP | 1349739 B1 | 6/2010 |
| EP | 2226048 | 9/2010 |
| EP | 2111203 B1 | 1/2011 |
| EP | 2111204 | 4/2011 |
| EP | 2364868 | 9/2011 |

(56) References Cited

FOREIGN PATENT DOCUMENTS

| | | |
|---|---|---|
| EP | 2364868 A1 | 9/2011 |
| EP | 2272478 B1 | 5/2012 |
| EP | 2295017 B1 | 5/2012 |
| EP | 2332506 B1 | 8/2012 |
| EP | 2340800 B1 | 4/2013 |
| EP | 2332753 B1 | 1/2014 |
| EP | 2070744 B1 | 4/2014 |
| EP | 2327572 B1 | 7/2014 |
| EP | 2277490 B1 | 1/2015 |
| EP | 2409674 B1 | 12/2015 |
| EP | 2485698 B1 | 5/2017 |
| EP | 2814441 B1 | 7/2017 |
| EP | 3238682 A2 | 11/2017 |
| FR | 27505 | 7/1924 |
| FR | 2215054 | 8/1974 |
| FR | 2399822 | 3/1979 |
| FR | 2455886 | 12/1980 |
| FR | 2498925 | 8/1982 |
| FR | 2738147 | 7/1997 |
| FR | 2749502 | 12/1997 |
| FR | 2858764 | 2/2005 |
| GB | 151915 | 10/1920 |
| GB | 154369 | 12/1920 |
| GB | 265885 | 2/1927 |
| GB | 474349 | 10/1937 |
| GB | 841175 | 7/1960 |
| GB | 1503910 | 3/1978 |
| GB | 2040237 | 8/1980 |
| GB | 2061197 | 5/1981 |
| GB | 2141980 | 1/1985 |
| GB | 2224980 | 5/1990 |
| JP | 57-186589 | 11/1982 |
| JP | 03-011978 | 12/1989 |
| JP | 04-158864 | 6/1992 |
| JP | 07-328073 | 12/1995 |
| JP | 08-038552 | 2/1996 |
| JP | 410248877 | 9/1998 |
| JP | 11059506 | 3/1999 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 8/2001 |
| JP | 2001 258948 | 9/2001 |
| JP | 2001 327545 | 11/2001 |
| JP | 2002 143223 | 5/2002 |
| JP | 2002 165841 | 6/2002 |
| JP | 2004 202264 | 7/2004 |
| SE | 431393 | 11/1983 |
| WO | 82/00445 | 2/1982 |
| WO | 84/04451 | 11/1984 |
| WO | 87/06205 | 4/1987 |
| WO | 89/06117 | 7/1989 |
| WO | 90/05515 | 5/1990 |
| WO | 90/06097 | 6/1990 |
| WO | 92/09463 | 6/1992 |
| WO | 93/24342 | 12/1993 |
| WO | 94/13241 | 6/1994 |
| WO | 94/15567 | 7/1994 |
| WO | 96/15752 | 5/1996 |
| WO | 97/44206 | 11/1997 |
| WO | 98/76184 | 10/1998 |
| WO | 99/17700 | 4/1999 |
| WO | 00/08910 | 2/2000 |
| WO | 00/09356 | 2/2000 |
| WO | 00/12040 | 3/2000 |
| WO | 00/54718 | 9/2000 |
| WO | 00/66060 | 11/2000 |
| WO | 01/01914 | 1/2001 |
| WO | 02/34190 | 5/2002 |
| WO | 03/030800 | 4/2003 |
| WO | 03/034969 | 5/2003 |
| WO | 03/049664 | 6/2003 |
| WO | 03/101364 | 12/2003 |
| WO | 04/16451 | 2/2004 |
| WO | 04/37569 | 5/2004 |
| WO | 07/11668 | 1/2007 |
| WO | 07/22387 A2 | 2/2007 |
| WO | 07/79346 | 7/2007 |
| WO | 08/124953 | 3/2008 |
| WO | 08/84462 | 7/2008 |
| WO | 08/97879 | 8/2008 |
| WO | 08/100759 | 8/2008 |
| WO | 2008/134898 A1 | 11/2008 |
| WO | 2017053689 A1 | 3/2017 |

OTHER PUBLICATIONS

Notice of Allowance from U.S. Appl. No. 12/330,554 dated Feb. 14, 2012.
Office Action from U.S. Appl. No. 12/522,837 dated Feb. 15, 2011.
Amendment from U.S. Appl. No. 12/522,837 dated Jun. 15, 2011.
Notice of Allowance from U.S. Appl. No. 12/522,837 dated Jul. 26, 2011.
Notice of Allowance from U.S. Appl. No. 12/522,837 dated Jun. 28, 2012.
Office Action from U.S. Appl. No. 12/523,630 dated Dec. 21, 2011.
Response from U.S. Appl. No. 12/523,630 dated Mar. 15, 2012.
Notice of Allowance from U.S. Appl. No. 12/523,630 dated Jun. 11, 2012.
Restriction /Election Requirement for U.S. Appl. No. 12/524,476 dated Dec. 31, 2012.
Office Action from U.S. Appl. No. 12/524,476 dated May 22, 2013.
Amendment in U.S. Appl. No. 12/524,476 dated Nov. 20, 2013.
Final Office Action in U.S. Appl. No. 12/524,476 dated Feb. 27, 2014.
Notice of Allowance from U.S. Appl. No. 12/524,476 dated Aug. 15, 2014.
Office Action from U.S. Appl. No. 12/568,728 dated Jun. 10, 2010.
Response from U.S. Appl. No. 12/568,728 dated Nov. 5, 2010.
Office Action from U.S. Appl. No. 12/568,728 dated Jan. 24, 2011.
Notice of Allowance from U.S. Appl. No. 12/568,728 dated Oct. 26, 2011.
Examiner-Initiated Interview Summary from U.S. Appl. No. 12/568,728 dated Dec. 8, 2011.
RCE with Remarks (Amendments to Specification) from U.S. Appl. No. 12/568,728 dated Jan. 9, 2012.
Notice of Allowance from U.S. Appl. No. 12/568,728 dated Jan. 24, 2012.
Office Action from U.S. Appl. No. 13/413,839 dated Sep. 26, 2013.
Response to Office Action from U.S. Appl. No. 13/413,839 dated Feb. 26, 2014.
Notice of Allowance from U.S. Appl. No. 13/413,839 dated May 1, 2014.
Restriction Requirement in U.S. Appl. No. 13/465,404 dated Jan. 3, 2013.
Response to Restriction Requirement in U.S. Appl. No. 13/465,404 dated Feb. 4, 2013.
Office Action in U.S. Appl. No. 13/465,404 dated Apr. 11, 2013.
Response to Office Action in U.S. Appl. No. 13/465,404 dated Jul. 11, 2013.
Notice of Allowance in U.S. Appl. No. 13/465,404 dated Sep. 27, 2013.
Office Action from U.S. Appl. No. 13/465,268 dated Jul. 19, 2012.
Response to Office Action from U.S. Appl. No. 13/465,268 dated Jan. 22, 2013.
Final Office Action in U.S. Appl. No. 13/465,268 dated Apr. 15, 2013.
Amendment with RCE, terminal disclaimer for U.S. Appl. No. 13/465,268 dated Oct. 15, 2013.
Non-Final Office Action in U.S. Appl. No. 13/465,268 dated Apr. 15, 2014.
Notice of Allowance for U.S. Appl. No. 13/465,268 dated Oct. 24, 2014.
First Office Action in U.S. Appl. No. 13/566,473 dated Dec. 6, 2012.
Response in U.S. Appl. No. 13/566,473 dated Apr. 8, 2013.
Office Action in U.S. Appl. No. 13/568,623 dated Feb. 1, 2013.

(56) References Cited

OTHER PUBLICATIONS

Response to Office Action in U.S. Appl. No. 13/568,623 dated Jun. 19, 2013.
Notice of Allowance in U.S. Appl. No. 13/568,623 dated Oct. 9, 2013.
Notice of Allowance in U.S. Appl. No. 13/568,623 dated Apr. 2, 2014.
Restriction Requirement in U.S. Appl. No. 12/900,548 dated Jun. 28, 2013.
Response to Restriction Requirement in U.S. Appl. No. 12/900,548 dated Jul. 29, 2013.
Office Action in U.S. Appl. No. 12/900,548 dated Sep. 9, 2013.
Response to Office Action in U.S. Appl. No. 12/900,548 dated Jan. 28, 2014.
Office Action in U.S. Appl. No. 12/900,548 dated Jun. 2, 2014.
RCE and Amendment Filed in U.S. Appl. No. 12/900,548 dated Oct. 1, 2014.
Notice of Allowance in U.S. Appl. No. 12/900,548 dated Dec. 18, 2014.
Restriction Requirement from U.S. Appl. No. 13/768,878 dated Jun. 4, 2014.
Response to Restriction Requirement in U.S. Appl. No. 13/768,878 dated Sep. 4, 2014.
U.S. Patent Office Action from U.S. Appl. No. 09/698,481 dated Jun. 27, 2002.
Response from U.S. Appl. No. 09/698,481 dated Oct. 29, 2002.
U.S. Patent Office Advisory Action from U.S. Appl. No. 09/698,481 dated Nov. 13, 2002.
Supplemental Amendment after Final from U.S. Appl. No. 09/698,481 dated Nov. 27, 2002.
Notice of Allowance from U.S. Appl. No. 09/698,481 dated Dec. 12, 2002.
Office Action from U.S. Appl. No. 09/712,547 dated May 23, 2001.
Response from U.S. Appl. No. 09/712,547 dated Aug. 23, 2001.
Office Action from U.S. Appl. No. 09/712,547 dated Oct. 30, 2001.
Response from U.S. Appl. No. 09/712,547 dated Jan. 28, 2002.
Notice of Allowance from U.S. Appl. No. 09/712,547 dated Mar. 11, 2002.
Office Action from U.S. Appl. No. 09/974,348 dated Feb. 27, 2003.
Response from U.S. Appl. No. 09/974,348 dated Jul. 28, 2003.
Office Action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Office Action from related U.S. Appl. No. 10/044,826, dated Apr. 29, 2003.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
Response from U.S. Appl. No. 10/044,826 dated Aug. 16, 2004.
Notice of Allowability from U.S. Appl. No. 10/044,826 dated Jun. 14, 2005.
Notice of Allowance from U.S. Appl. No. 10/044,826 dated Apr. 3, 2006.
U.S. Patent Office Action from U.S. Appl. No. 10/390,133 dated Aug. 8, 2003.
Response from U.S. Appl. No. 10/390,133 dated Feb. 11, 2004.
U.S. Patent Office Action from U.S. Appl. No. 10/390,133 dated Jun. 16, 2004.
Response from U.S. Appl. No. 10/390,133 dated Dec. 20, 2004.
Supplemental Notice of Allowance from U.S. Appl. No. 10/390,133 dated Mar. 30, 2005.
Notice of Allowance from U.S. Appl. No. 10/390,133 dated Jan. 11, 2005.
U.S. Patent Office Action from U.S. Appl. No. 10/390,386 dated Aug. 8, 2003.
Response from U.S. Appl. No. 10/390,386 dated Nov. 11, 2003.
U.S. Patent Office Action from U.S. Appl. No. 10/390,386 dated Jan. 28, 2004.
Response from U.S. Appl. No. 10/390,386 dated May 28, 2004.
U.S. Patent Office Action from U.S. Appl. No. 10/390,386 dated Oct. 12, 2004.
Response from U.S. Appl. No. 10/390,386 dated Mar. 16, 2005.
Notice of Allowance from U.S. Appl. No. 10/390,386 dated Apr. 7, 2005.
Notice of Allowance from U.S. Appl. No. 10/643,010 dated Sep. 30, 2004.
Office Action from U.S. Appl. No. 10/695,045 dated Feb. 22, 2005.
Response from U.S. Appl. No. 10/695,045 dated Jul. 25, 2005.
Office Action from U.S. Appl. No. 10/695,045 dated Oct. 20, 2005.
Response from U.S. Appl. No. 10/695,045 dated Jan. 17, 2006.
Notice of Allowance from U.S. Appl. No. 10/695,045 dated Apr. 11, 2006.
Office Action from U.S. Appl. No. 10/762,977 dated Jan. 18, 2005.
Response from U.S. Appl. No. 10/762,977 dated May 18, 2005.
Office Action from U.S. Appl. No. 10/762,977 dated Aug. 11, 2005.
Response from U.S. Appl. No. 10/762,977 dated Oct. 3, 2005.
Office Action from U.S. Appl. No. 10/762,977 dated Oct. 25, 2005.
Notice of Allowance from U.S. Appl. No. 10/762,977 dated Feb. 23, 2006.
Notice of Allowance from U.S. Appl. No. 11/077,483 dated Aug. 9, 2007.
Office Action from U.S. Appl. No. 11/145,477 dated Mar. 28, 2006.
Office Action from U.S. Appl. No. 11/145,477 dated Sep. 8, 2006.
Response from U.S. Appl. No. 11/145,477 dated Dec. 12, 2006.
Notice of Allowance from U.S. Appl. No. 11/145,477 dated Jan. 8, 2007.
U.S. Patent Office Action from U.S. Appl. No. 11/209,001 dated Jul. 25, 2006.
Office Action from U.S. Appl. No. 11/209,001 dated Nov. 8, 2006.
Notice of Abandonment from U.S. Appl. No. 11/209,001 dated Jul. 10, 2007.
Office Action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office Action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office Action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office Action from U.S. Appl. No. 11/472,509 dated May 15, 2009.
Response from U.S. Appl. No. 11/472,509 dated Nov. 15, 2009.
Office Action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509, filed Mar. 2, 2011.
Interview Summary from U.S. Appl. No. 11/472,509, filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.
Response from U.S. Appl. No. 11/472,509 dated Aug. 8, 2011.
Notice of Allowance from U.S. Appl. No. 11/472,509 dated Nov. 14, 2011.
Supplemental amendment identifying cross-references to related applications from U.S. Appl. No. 11/472,509 dated Aug. 7, 2012.
Notice of Allowance from U.S. Appl. No. 11/472,509 dated Oct. 19, 2012.
Office Action from U.S. Appl. No. 11/474,834 dated Mar. 21, 2007.

(56) References Cited

OTHER PUBLICATIONS

Response from U.S. Appl. No. 11/474,834 dated Jun. 28, 2007.
Office Action from U.S. Appl. No. 11/474,834 dated Sep. 20, 2007.
Response from U.S. Appl. No. 11/474,834 dated Nov. 20, 2007.
Notice of Allowance from U.S. Appl. No. 11/474,834 dated Jan. 17, 2008.
Office Action from U.S. Appl. No. 11/490,899 dated Nov. 8, 2006.
Office Action from U.S. Appl. No. 11/490,899 dated Jan. 9, 2007.
Response from U.S. Appl. No. 11/490,899 dated Mar. 20, 2007.
Notice of Allowance from U.S. Appl. No. 11/490,899 dated Jun. 6, 2007.
Notice of Allowance from U.S. Appl. No. 11/490,899 dated Feb. 10, 2009.
Notice of Allowance from U.S. Appl. No. 11/490,899 dated May 26, 2009.
Office Action from U.S. Appl. No. 12/118,099 dated Oct. 28, 2010.
Response to Office Action from U.S. Appl. No. 12/118,099 dated Apr. 25, 2011.
Notice of Allowance from U.S. Appl. No. 12/118,099 dated Jul. 28, 2011.
International Search Report and Written Opinion from PCT/US2021/018648 dated May 4, 2021.
Notice of Allowance from U.S. Appl. No. 12/118,099 dated Jul. 3, 2013.
Office Action from U.S. Appl. No. 12/330,554 dated Apr. 11, 2011.
Response to Office Action from U.S. Appl. No. 12/330,554 dated Jul. 11, 2011.
Notice of Allowance from U.S. Appl. No. 12/330,554 dated Sep. 23, 2011.
Response to Office Action from Control No. 90/007,491 dated Sep. 11, 2006.
Office Action dated Sep. 21, 2006 from Control No. U.S. Appl. No. 90/007,491.
Response from Control No. 90/007,491 dated Nov. 9, 2006.
Notice of Appeal from Control No. 90/007,491 dated Nov. 9, 2006.
Advisory Action from Control No. 90/007,491 dated Nov. 22, 2006.
Appeal Brief from Control No. 90/007,491 dated Jan. 16, 2007.
Advisory Action from Control No. 90/007,491 dated Apr. 20, 2007.
Amended Appeal Brief from Control No. 90/007,491 dated Jun. 29, 2007.
Examiner's Answer from Control No. 90/007,491 dated Sep. 24, 2007.
Reply Brief from Control No. 90/007,491 dated Nov. 21, 2007.
Supplemental Examiner's Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Amendment for U.S. Appl. No. 09/698,481 dated Mar. 27, 2002.
Complaint for Patent Infringement Demand for Jury Trial, Case No. 1:06CV0517 dated Mar. 7, 2006 (9 pages).
Request for Reexamination of U.S. Pat. No. 6,196,343, filed Apr. 28, 2006, 17 pgs.
Affidavit, executed Apr. 3, 2006 by Mark Sullivan, Invacare Corporation Vice President of Rehab submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Office Action from U.S. Appl. No. 08/228,584 dated Apr. 14, 1995.
Response from U.S. Appl. No. 08/228,584 dated Jul. 6, 1995.
Office Action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office Action from U.S. Appl. No. 08/228,584 dated Mar. 29, 1996.
Response from U.S. Appl. No. 08/228,584 dated Jun. 3, 1996.
Notice of Allowance from U.S. Appl. No. 08/228,584 dated Jun. 24, 1996.
Office Action from U.S. Appl. No. 08/694,484 dated Dec. 2, 1996.
Response from U.S. Appl. No. 08/694,484 dated Apr. 2, 1997.
Office Action from U.S. Appl. No. 08/694,484 dated Jul. 7, 1997.
Office Action from U.S. Appl. No. 08/694,484 dated Dec. 3, 1997.
Office Action from U.S. Appl. No. 08/694,484 dated Feb. 10, 1998.
Response from U.S. Appl. No. 08/694,484 dated May 4, 1998.
Notice of Allowance from U.S. Appl. No. 08/694,484 dated Jul. 31, 1998.
Office Action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office Action from U.S. Appl. No. 09/607,468 dated Sep. 26, 2001.
Response from U.S. Appl. No. 09/607,468 dated Dec. 21, 2001.
Office Action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.
U.S. Patent Office Action from U.S. Appl. No. 09/698,481 dated Nov. 27, 2001.
Response from U.S. Appl. No. 09/698,481 dated Mar. 27, 2002.
Office Action in U.S. Appl. No. 13/970,794 dated Oct. 22, 2013.
Response to Office Action in U.S. Appl. No. 13/970,794 dated Jan. 22, 2014.
Notice to Applicant Regarding Non-Compliant in U.S. Appl. No. 13/970,794 dated Feb. 4, 2014.
Response to Office Action in U.S. Appl. No. 13/970,794 dated Mar. 5, 2014.
Notice of Allowance in U.S. Appl. No. 13/970,794 dated Jun. 9, 2014.
Amendment from U.S. Appl. No. 16/594,544 dated Aug. 27, 2021.
Notice of Allowance from U.S. Appl. No. 16/594,544 dated Sep. 22, 2021.
Notice of Allowance from U.S. Appl. No. 16/740,785 dated Apr. 26, 2021.
Notice of Allowance from U.S. Appl. No. 16/740,785 dated Jun. 30, 2021.
Response to Office Action from U.S. Appl. No. 16/726,562 dated Jul. 15, 2021.
Notice of Allowance from U.S. Appl. No. 16/726,562 dated Jul. 22, 2021.
Notice of Allowance from U.S. Appl. No. 16/726,562 dated Aug. 25, 2021.
Notice of Allowance for U.S. Appl. No. 17/169,975 dated May 13, 2022.
Amendment After Notice of Allowance for U.S. Appl. No. 17/169,975 dated Jun. 29, 2022.
Notice of Allowance for U.S. Appl. No. 17/395,565 dated Jun. 23, 2022.
Notice of Allowance for U.S. Appl. No. 17/395,565 dated Aug. 15, 2022.
Notice of Allowance for U.S. Appl. No. 13/768,878 dated Dec. 11, 2015.
Office Action from U.S. Appl. No. 13/768,878 dated Dec. 3, 2014.
Response to Office Action from U.S. Appl. No. 13/768,878 dated Jan. 21, 2015.
Notice of Allowance from U.S. Appl. No. 14/162,955 dated May 26, 2015.

(56) References Cited

OTHER PUBLICATIONS

Office Action from U.S. Appl. No. 14/446,735 dated Jan. 14, 2016.
Response to Office Action from U.S. Appl. No. 14/446,735 dated Apr. 12, 2016.
Notice of Allowance from U.S. Appl. No. 14/446,735 dated Jul. 15, 2016.
Notice of Allowance from U.S. Appl. No. 14/446,735 dated Nov. 16, 2016.
Restriction Requirement from U.S. Appl. No. 14/486,766 dated Jun. 8, 2015.
Response to Restriction Requirement from U.S. Appl. No. 14/486,766 dated Aug. 10, 2015.
Office Action from U.S. Appl. No. 14/486,766 dated Sep. 16, 2015.
Response to Office Action from U.S. Appl. No. 14/486,766 dated Dec. 8, 2015.
Notice of Allowance from U.S. Appl. No. 14/486,766 dated Feb. 9, 2016.
Office Action from U.S. Appl. No. 14/566,899 dated Sep. 17, 2015.
Response to Office Action from U.S. Appl. No. 14/566,899 dated Dec. 10, 2015.
Notice of Allowance from U.S. Appl. No. 14/566,899 dated Jan. 21, 2016.
Office Action from U.S. Appl. No. 14/585,393 dated Sep. 3, 2015.
Response to Office Action from U.S. Appl. No. 14/585,393 dated Jan. 21, 2016.
Notice of Allowance from U.S. Appl. No. 14/585,393 dated Feb. 22, 2016.
Office Action from U.S. Appl. No. 14/690,678 dated Nov. 16, 2015.
Office Action from U.S. Appl. No. 16/390,618 dated Jun. 24, 2020.
Response to Office Action from U.S. Appl. No. 16/390,618 dated Sep. 24, 2020.
Notice of Allowance from U.S. Appl. No. 16/390,618 dated Oct. 9, 2020.
Office Action from U.S. Appl. No. 16/594,544 dated May 27, 2021.
Office Action from U.S. Appl. No. 16/740,785 dated Sep. 14, 2020.
Response to Non-Final OA from U.S. Appl. No. 16/740,785 dated Dec. 14, 2020.
Office Action from U.S. Appl. No. 16/726,562 dated Apr. 15, 2021.
Notice of Allowance from U.S. Appl. No. 15/918,730 dated Apr. 28, 2021.
Oct. 1999 user manual for Quickie@ S-626 (User Instruction Manual & Warranty) 51 pages.
English Translation of Nullity Suit filed by Sunrise Medical GmbH in European Publication No. 2070744 B1, dated Mar. 1, 2021, 53 pages.
Nichtigkeitsklage re dt. Teil EP744 Sunrise Medical GmbH_ 01032021 (German Nullity Complaint) dated Mar. 1, 2021, 75 pages.
Quickie@ S-626 figure compilation ( 2 pages), provided as exhibit with Nullity Suit filed by Sunrise Medical GmbH in European Publication No. 2070744 B1, dated Mar. 1, 2021.
"All-Terrain Wheelchair, Designer's Corner", Design News, Feb. 24, 1992, cover page and p. 54.
"Big Bounder Power Wheelchair: Conventional "Tubular" Style Frame"; http://www.wheelchair.com/bigbounderpage.htm, Accessed on the World Wide Web on Dec. 17, 2003, p. 1-4.
"Bounder Plus Power Wheelchair: Convention "Tubular" Style Frame"; http://www.wheelchairs.com/plus.htm, Accessed on the World Wide Web on Dec. 17, 2003, p. 1-4.
"Frog Legs: Smooth Ride Ahead"; http://www.froglegsinc.com/index.php, Accessed on the World Wide Web on Dec. 17, 2003, p. 105.
"Frog Legs Tires", http://mdtap.org/tt/1999.09/prod.html, Accessed on the World Wide Web on Dec. 17, 2003, p. 1-3.
Golden Technologies Advertisement Video https://www.youtube.com/watch?v=nexltKOWBS8, accessed Jul. 26, 21 (copyrighted 2011 indicated on video).
"Invacare pronto M7I jr. Power Wheelchair Manual"; Accessed on the World Wide Web on Dec. 17, 2003.

"Invacare Storm Series TDX Power Wheelchairs Manual"; Accessed on the World Wide Web on Dec. 17, 2003, p. 1-24.
"Invacare Xterra Series GT Power Wheelchair Manual", Accessed on the World Wide Web on Dec. 17, 2003, p. 1-4.
"Jazzy 1122", Pride Mobile Products Corp., Accessed on the World Wide Web on Dec. 17, 2003, p. 1-2.
"Jazzy 1133", Pride Mobile Products Corp., Accessed on the World Wide Web on Dec. 17, 2003, p. 1-2.
"Jazzy 1170XL", Pride Mobile Products Corp., Accessed on the World Wide Web on Dec. 17, 2003, p. 1-2.
Kauzlarich, J. et al., "Wheelchair Caster Shimmy II: Damping", Journal for Rehabilitative Research and Development, May/Jun. 2000, vol. 37, No. 3, pp. 305-314.
McLauren, C., "Future Developments—Current Directions in Wheelchair Research", Journal for Rehabilitative Research and Development, Jul./Aug. 1985, vol. 42, No. 4 Suppl. No. 2, pp. 88-99.
"Bruno Independent Living Aids ISP 9001 Certified"; http://www.bruno.com/power_chairs.htm, Accessed on the World Wide Web on Dec. 17, 2003, p. 1-5.
"Top End Terminator SS Sports Wheelchair", http://phc-online.com/terminator_ss.htm, Accessed on the World Wide Web on Dec. 17, 2003, p. 1-5.
"TransActions of the Institute of Measurement and Control", The British Library of Science Technology and Business, vol. 24, Nov. 5, 2002, 15 pgs.
M.J. Lawn, et al., "Modeling of a Stair-Climbing Wheelchair Mechanism with High Single-Step Capability", IEEE TransActions on Neutral Systems and Rehabilitation Engineering, vol. 11, No. 3, Sep. 2003, pp. 323-332.
Quickie G-424 User Instruction Manual & Warranty, 930484 Rev. A (27 sheets) (alleged date not later than 2000).
10 photographs (8.5 x 11) of Quickie G-424 Wheelchair obtained Nov. 24, 2004.
Sunrise Medical, Inc., Power Products Parts Manual, 930307 Rev. K (264 double sided sheets), Jul. 2004. (Note: various dates are alleged therein based on wheelchair products listed including the Quickie G-424).
Permobil Chairman HD3 Owner's Manual dated May 2003, 52 pages.
Permobil C400 Power Wheelchair, Owner's Manual, version 6, 2010, Permobil AB, Sweden, 100 pgs.
Permobil C500 Power Wheelchair, Owner's Manual, version 6, 2010, Permobil AB, Sweden, 100 pgs.
Pride Mobility, Jet 3 Ultra Owner's Manual dated Jun. 2007, 43 pages.
Quantum Series Owner's Manual dated Feb. 2009, 43 pages.
"Bike" magazine article, "Ten Underrated Products You Probably Don't Own but Maybe Should" (in part), Jan. 1994, pp. 82 and 83.
"Bike" magazine article "Softride Contour", Mar. 1994, pp. 64-65.
"Mountain Bike Action", picture and caption describing "Body Shock", Jan. 1994, p. 48.
International Search Report from PCT/US98/07543 dated Aug. 19, 1998.
International Search Report from PCT/US01/42656 dated Jan. 14, 2003.
International Search Report from PCT/US02/29996 dated Jun. 24, 2003, 2 pgs.
International Preliminary Examination Report from PCT/US02/29996 dated Dec. 11, 2003.
International Search Report from PCT/US02/29998 dated Dec. 12, 2002.
International Preliminary Examination Report from PCT/US02/29998 dated Jan. 13, 2004.
International Search Report and Written Opinion from PCT/US03/25736 dated Dec. 28, 2004.
International Search Report from PCT/US03/34124 dated Dec. 28, 2004.
International Preliminary Examination Report from PCT/US03/34124 dated Aug. 25, 2006.
International Search Report and Written Opinion from PCT/IB08/050111 dated Jun. 4, 2008.
Amendments under Article 34(2)(b) PCT and Comments from PCT/IB08/050111 dated Oct. 2, 2008.

(56) References Cited

OTHER PUBLICATIONS

International Preliminary Report on Patentability for International Patent Application No. PCT/IB08/050111 dated Apr. 22, 2009.
International Search Report and Written Opinion from PCT/US08/52878 dated Jul. 3, 2008.
International Search Report and Written Opinion from PCT/US08/53242 dated Sep. 3, 2008.
International Search Report and Written Opinion from PCT/US10/51888 dated Dec. 6, 2010.
International Search Report and Written Opinion for PCT/US13/026441 dated Apr. 23, 2013.
Office Action dated Feb. 2, 2006 from Control No. 90/007,491.
Interview Summary from Control No. 90/007,491 dated Mar. 23, 2006.
Statement as to the substance of an Interview from Control No. 90/007,491, filed Apr. 3, 2006.
Response from Control No. 90/007,491 dated Apr. 3, 2006.
Office Action dated Jul. 5, 2006 from Control No. 90/007,491.
Response to Office Action from U.S. Appl. No. 14/690,678 dated Mar. 16, 2016.
Office Action from U.S. Appl. No. 14/690,678 dated Jul. 15, 2016.
Pre-Brief Conference Request and Notice of Appeal from U.S. Appl. No. 14/690,678 dated Dec. 19, 2016.
Pre-Brief Appeal Conference Decision from U.S. Appl. No. 14/690,678 dated Feb. 3, 2017.
Office Action from U.S. Appl. No. 14/690,678 dated May 10, 2017.
Amendment from U.S. Appl. No. 14/690,678 dated Jul. 31, 2017.
Notice of Allowance from U.S. Appl. No. 14/690,678 dated Oct. 26, 2017.
Office Action from U.S. Appl. No. 14/875,110 dated May 20, 2016.
Response to Office Action from U.S. Appl. No. 14/875,110 dated Sep. 20, 2016.
Final Office Action from U.S. Appl. No. 14/875,110 dated Feb. 15, 2017.
Response to Office Action from U.S. Appl. No. 14/875,110 dated May 15, 2017.
Office Action from U.S. Appl. No. 14/875,110 dated May 24, 2017.
Amendment from U.S. Appl. No. 14/875,110 dated Sep. 25, 2017.
Final Office Action from U.S. Appl. No. 14/875,110 dated Dec. 11, 2017.
Response to Office Action from U.S. Appl. No. 14/875,110 dated Jan. 23, 2018.
Notice of Allowance from U.S. Appl. No. 14/875,110 dated Feb. 16, 2018.
Office Action from U.S. Appl. No. 15/060,121 dated Oct. 31, 2016.
Response to Office Action from U.S. Appl. No. 15/060,121 dated Jan. 31, 2017.
Notice of Allowance from U.S. Appl. No. 15/060,121 dated May 17, 2017.
Office Action from U.S. Appl. No. 15/146,260 dated Apr. 10, 2017.
Amendment from U.S. Appl. No. 15/146,260 dated Jun. 22, 2017.
Notice of Allowance from U.S. Appl. No. 15/146,260 dated Jul. 27, 2017.
Ex Parte Quayle Action from U.S. Appl. No. 15/151,929 dated Aug. 8, 2017.
Response to Ex Parte Quayle Action from U.S. Appl. No. 15/151,929 dated Oct. 9, 2017.
Office Action from U.S. Appl. No. 15/159,264 dated Nov. 17, 2016.
Notice of Allowance from U.S. Appl. No. 15/151,929 dated Nov. 16, 2017.
Response to Office Action from U.S. Appl. No. 15/159,264 dated Feb. 17, 2017.
Final Office Action from U.S. Appl. No. 15/159,264 dated Jun. 13, 2017.
Response After Final from U.S. Appl. No. 15/159,264 dated Sep. 12, 2017.
Advisory Action from U.S. Appl. No. 15/159,264 dated Sep. 28, 2017.
Office Action from U.S. Appl. No. 15/159,264 dated Dec. 26, 2017.
Amendment from U.S. Appl. No. 15/159,264 dated Apr. 26, 2018.
Final Office Action from U.S. Appl. No. 15/159,264 dated Aug. 10, 2018.
Office Action from U.S. Appl. No. 15/447,988 dated Aug. 7, 2018.
Amendment from U.S. Appl. No. 15/447,988 dated Nov. 7, 2018.
Notice of Allowance from U.S. Appl. No. 15/447,988 dated Dec. 14, 2018.
Ex Parte Quayle Action from U.S. Appl. No. 15/645,749 dated Aug. 7, 2018.
Response to Ex Parte Quayle Action from U.S. Appl. No. 15/645,749 dated Oct. 24, 2018.
Notice of Allowance from U.S. Appl. No. 15/645,749 dated Feb. 6, 2019.
Notice of Allowance from U.S. Appl. No. 15/645,749 dated May 28, 2019.
Office Action from U.S. Appl. No. 15/822,967 dated Apr. 8, 2019.
Amendment from U.S. Appl. No. 15/822,967 dated Jul. 31, 2019.
Notice of Allowance from U.S. Appl. No. 15/822,967 dated Aug. 28, 2019.
Office Action from U.S. Appl. No. 15/935,538 dated Mar. 26, 2019.
Response to Office Action from U.S. Appl. No. 15/935,538 dated Jun. 26, 2019.
Notice of Allowance from U.S. Appl. No. 15/935,538 dated Aug. 9, 2019.
Office Action from U.S. Appl. No. 16/390,618 dated Aug. 22, 2019.
Response to Office Action from U.S. Appl. No. 16/390,618 dated Nov. 22, 2019.
Office Action from U.S. Appl. No. 16/390,618 dated Mar. 4, 2020.
Response to Office Action from U.S. Appl. No. 16/390,618 dated Jun. 4, 2020.
Office Action for U.S. Appl. No. 17/900,925 dated Dec. 20, 2022.
Notice of Allowance for U.S. Appl. No. 17/394,525 dated Jul. 20, 2023.
Notice of Allowance for U.S. Appl. No. 17/900,925 dated Jul. 12, 2023.
Notice of Allowance for U.S. Serial No. 17/979, 107 dated Sep. 20, 2023.
Amendment for U.S. Appl. No. 17/900,925 dated Jun. 13, 2023.

* cited by examiner

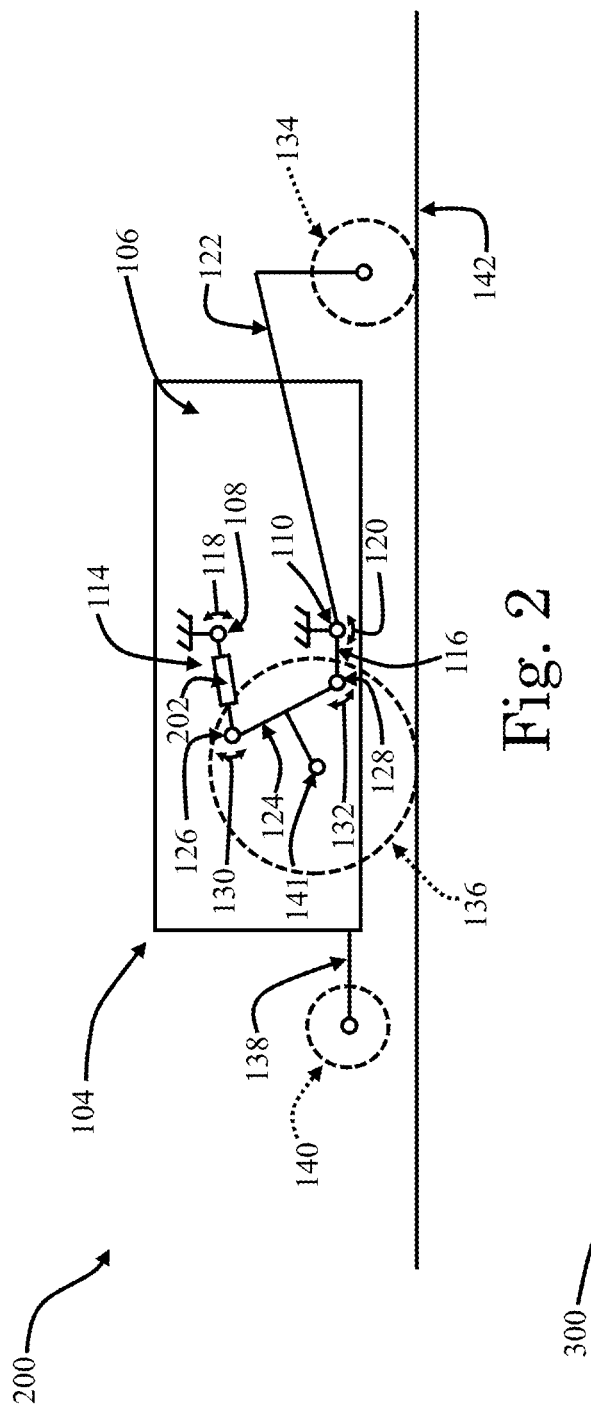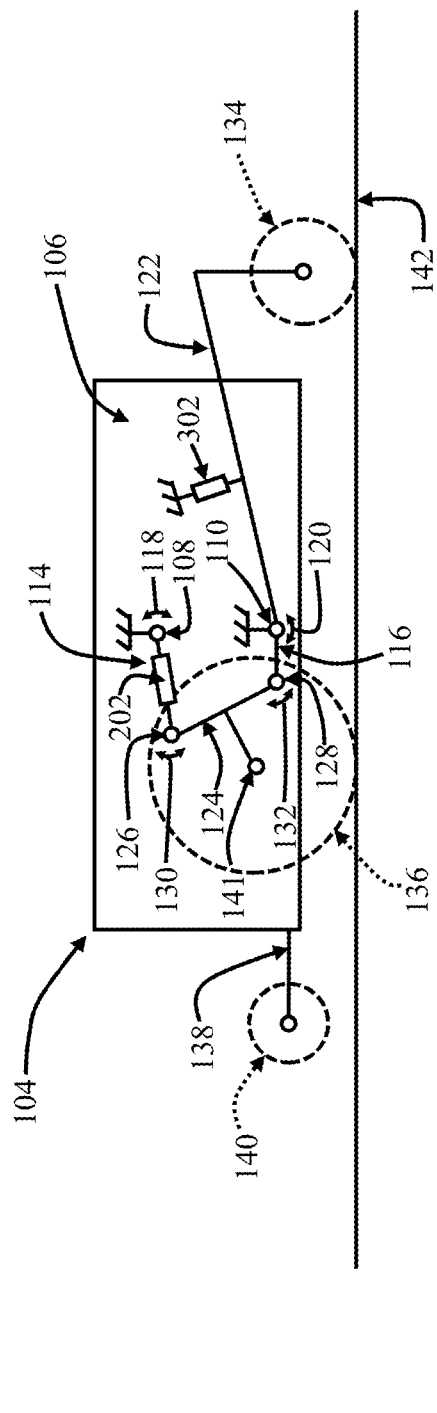

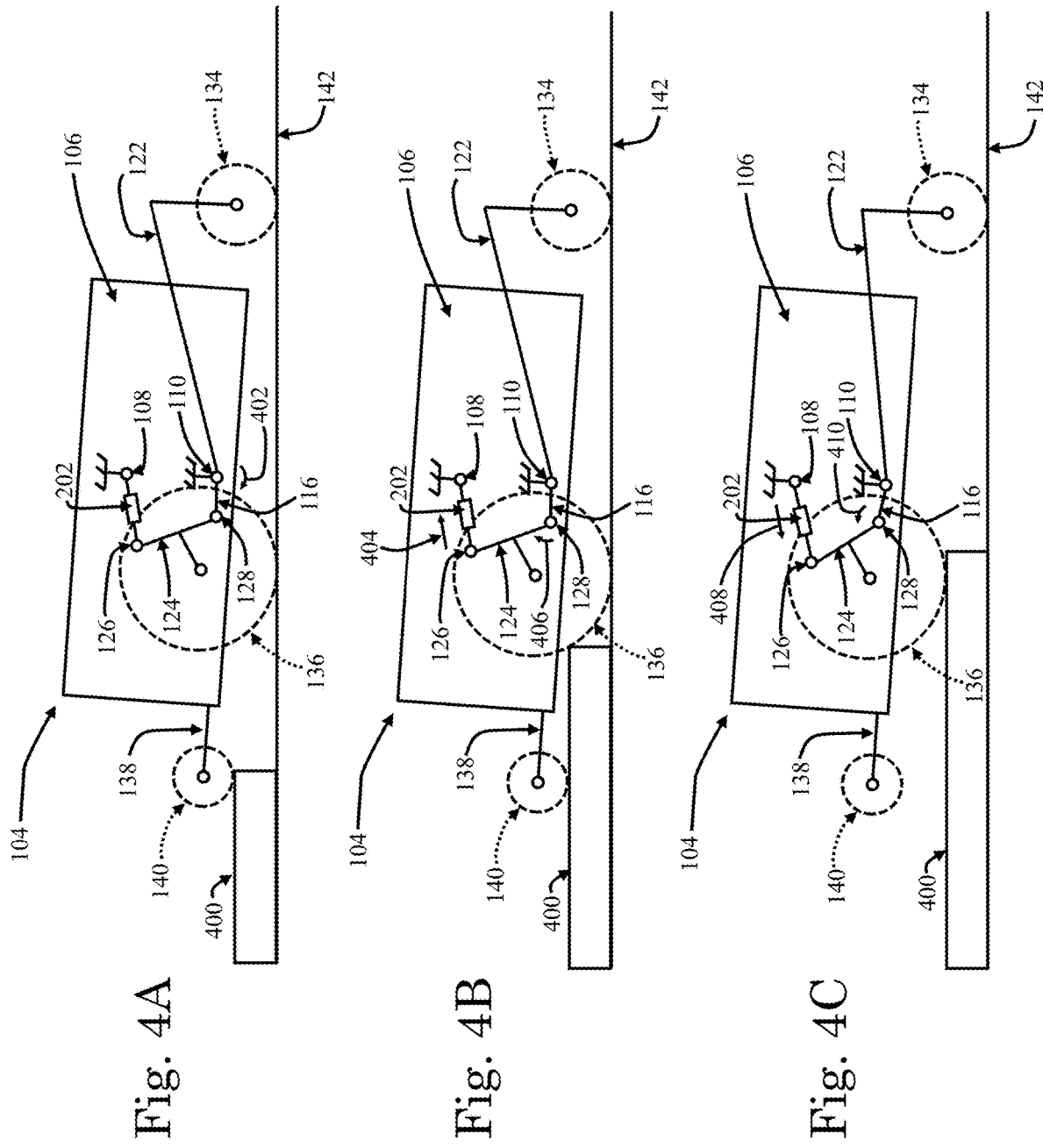

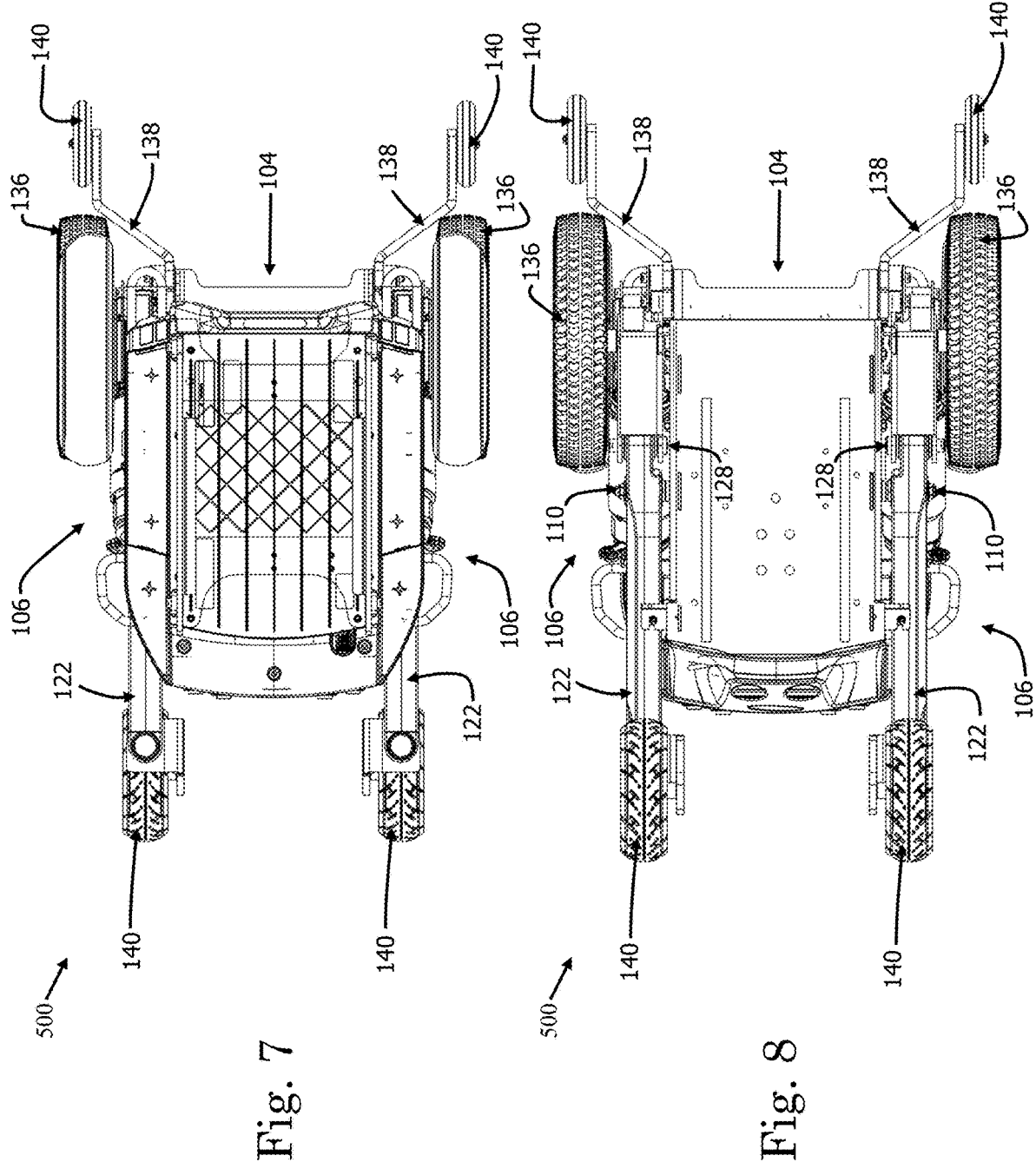

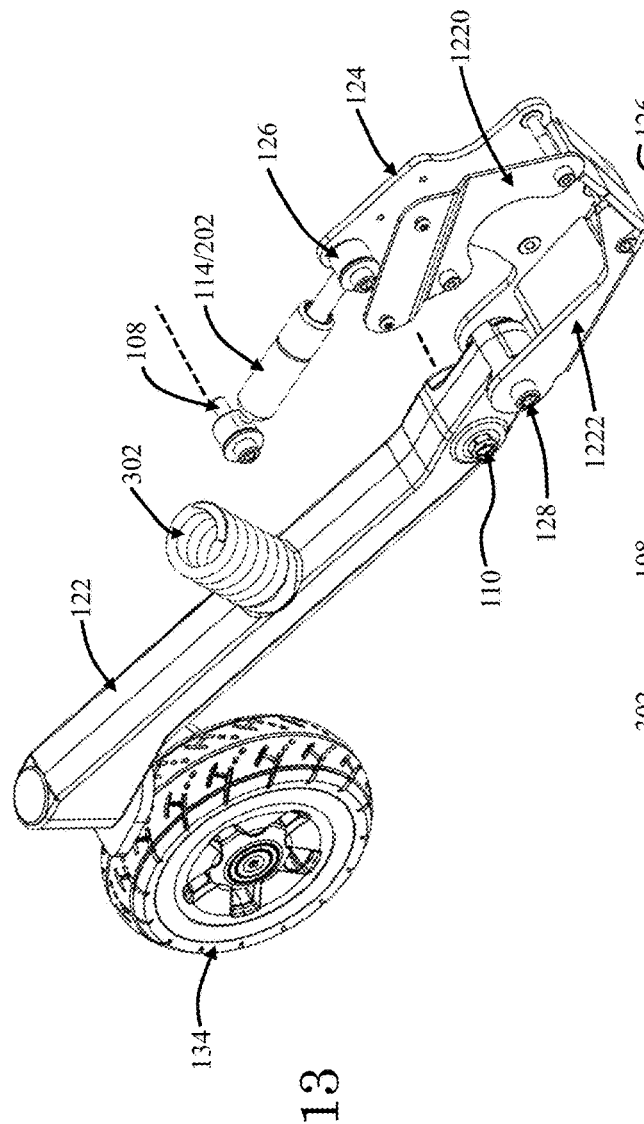
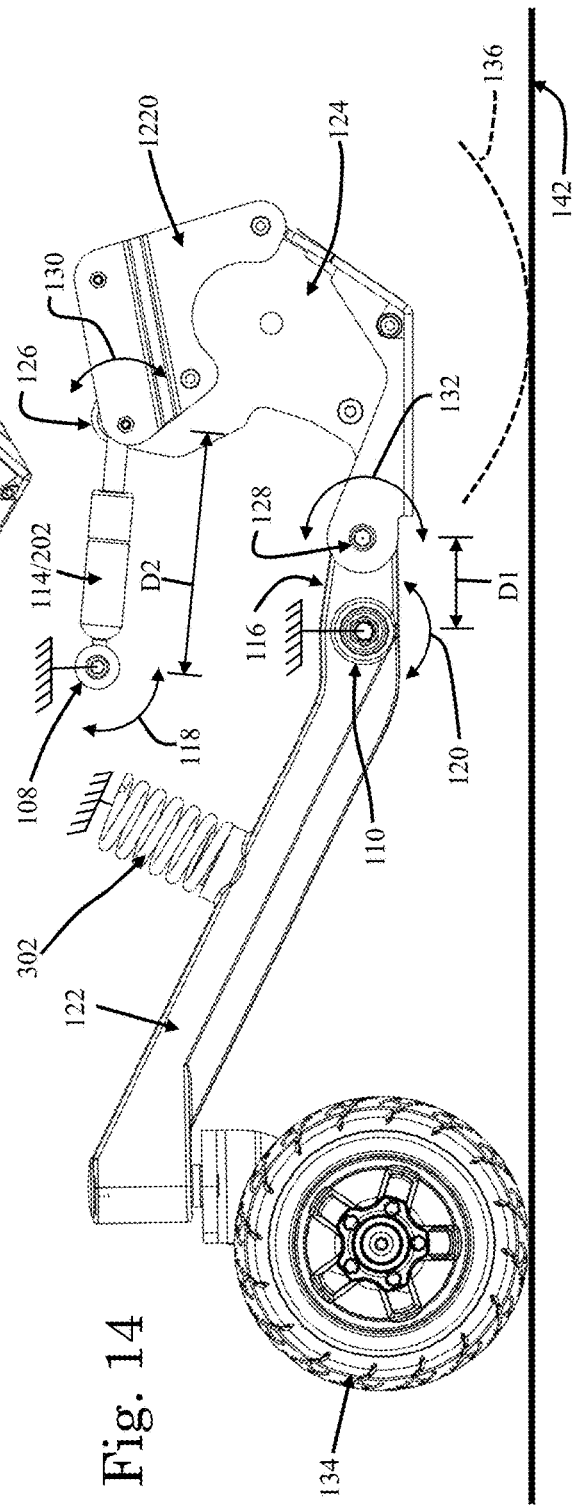
Fig. 13
Fig. 14

WHEELCHAIR AND SUSPENSION SYSTEMS

CROSS-REFERENCE TO RELATED APPLICATIONS

This application claims priority to U.S. Provisional Patent Application Ser. No. 62/981,265, filed on Feb. 25, 2020 and which is hereby fully incorporated by reference.

BACKGROUND

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs that are commonly present at sidewalks, driveways, and other paved surface interfaces. This degree of independence can also be limited if the vehicle is required to ascend inclines or descend declines.

Most wheelchairs have front and/or rear anti-tip wheels to stabilize the chair from excessive tipping forward or backward and to ensure that the drive wheels are always in contact with the ground. The anti-tip wheels are typically much smaller than the drive wheels. In center wheel drive (CWD) wheelchairs, the front anti-tip wheels are normally ground engaging and mounted on pivot arms so the front anti-tip wheels can raise and lower when traveling over obstacles. Examples of CWD wheelchairs are shown in U.S. Pat. Nos. 7,040,429, 7,219,755, 7,066,290, 8,534,679, 8,794,359, and 8,910,975, which are hereby fully incorporated by reference.

In front wheel drive (FWD) wheelchairs, the front anti-tip wheels are typically suspended above the ground, as shown in U.S. Pat. No. 9,010,470 to Cuson et al. and hereby fully incorporated by reference. By having the front anti-tip wheels suspended above the ground, FWD wheelchairs allow the much larger front drive wheels to navigate over the obstacle without being impeded by the front anti-tip wheels.

While these configurations provide important advancements, additional improvements are desirable including better ground engagement (or traction) by drive wheels and more comfortable rides as rough terrain or obstacles are traversed.

SUMMARY

In one embodiment, a wheelchair is provided having a suspension system. The suspension includes a drive assembly that is pivotably connected to a base frame at multiple locations. In one embodiment, the connection is via intermediary pivoting links or arms. Embodiments of the links or arms include rigid links, resilient links, elastic links, shocks, springs, gas cylinders and lockable gas cylinders (or combinations of the foregoing). The drive assembly can, via the pivot connections, pivot to accommodate and traverse variations and obstacles on ground surfaces.

BRIEF DESCRIPTION OF THE DRAWINGS

In the accompanying drawings which are incorporated in and constitute a part of the specification, embodiments of the inventions are illustrated, which, together with a general description of the inventions above, and the detailed descriptions given below, serve to example the principles of the inventions.

FIGS. 1-4C illustrate various embodiments of a power wheelchair and suspension system.

FIGS. 5-11 illustrate various views of another embodiment of a power wheelchair and suspension system.

FIGS. 13 and 14 are select component views of the suspension system shown in FIG. 12.

DESCRIPTION

Embodiments of the invention provide, for example, a wheelchair suspension having the ability for drive wheels to maintain traction and comfort while traversing rough terrain or obstacles. The suspension can pivot the drive assembly about one or more pivot axes with respect to the base frame. In one embodiment, the drive assembly pivots about multiple pivot axes with respect to the drive assembly providing traction control and ride comfort over rough terrain and obstacles. The embodiments of suspension systems disclosed herein are applicable to any configuration of wheelchair or mobility vehicle including FWD, CWD and RWD (rear wheel drive).

Figure 1:
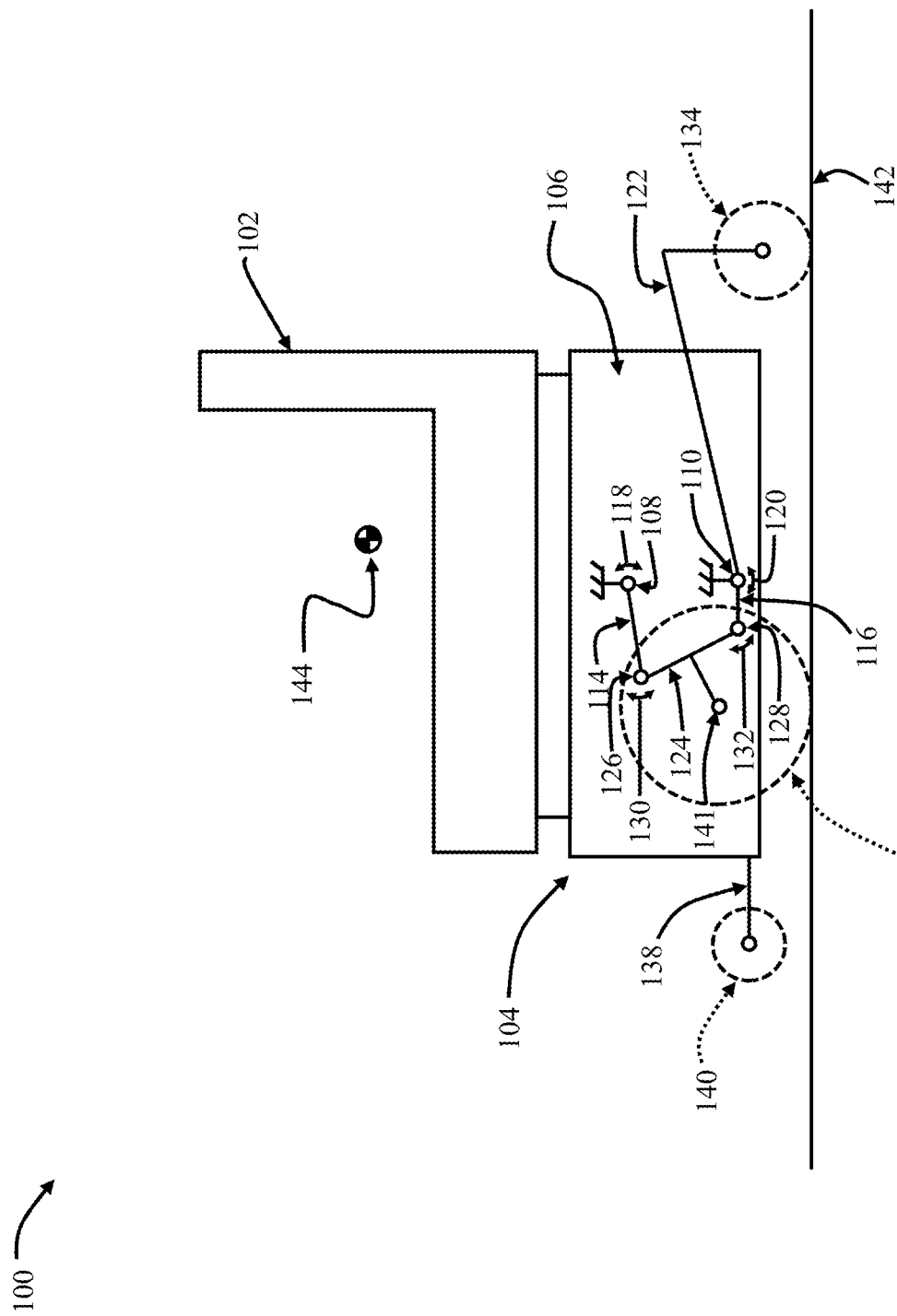
Figure 5:
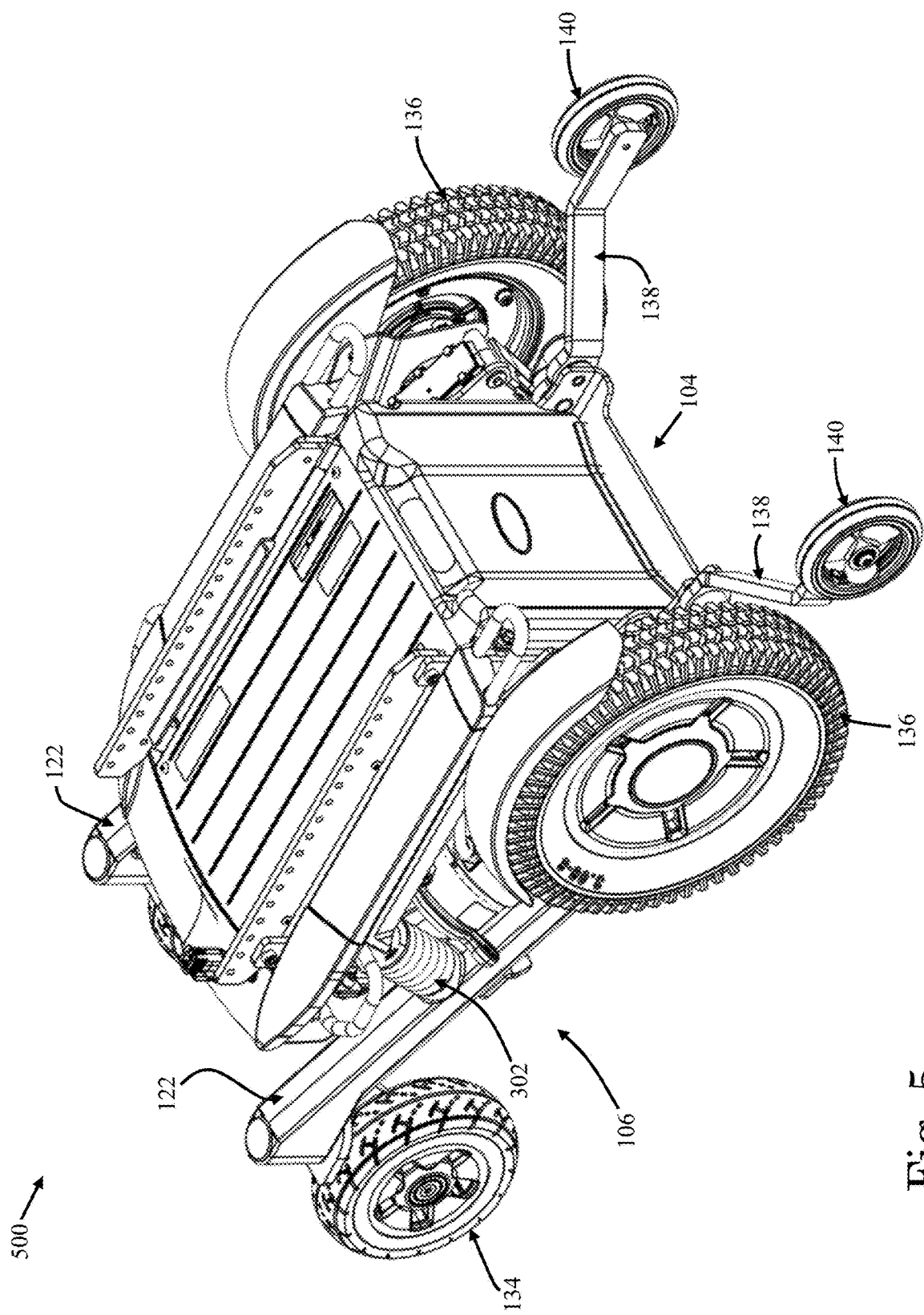
Figure 6:
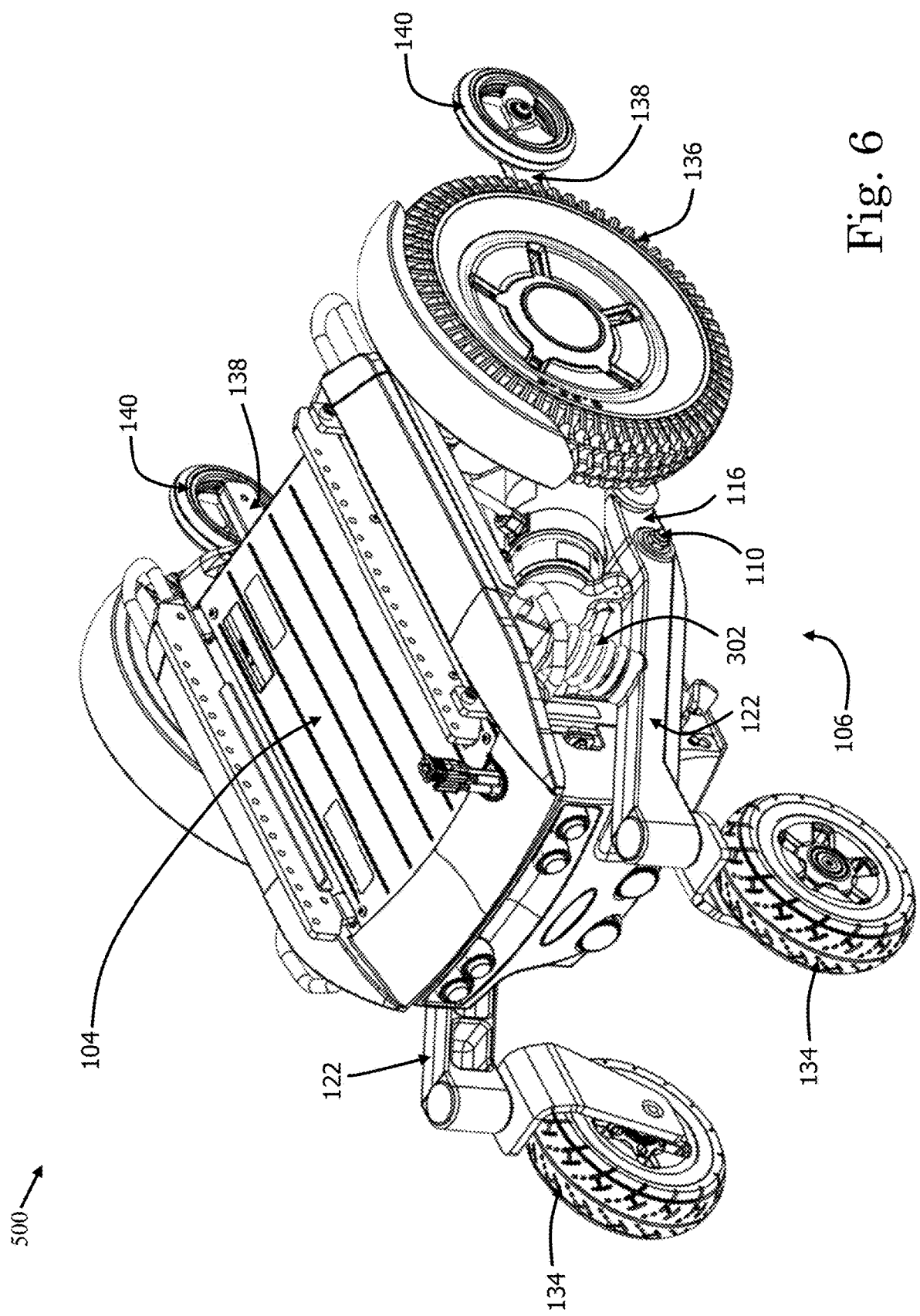
Figure 9:
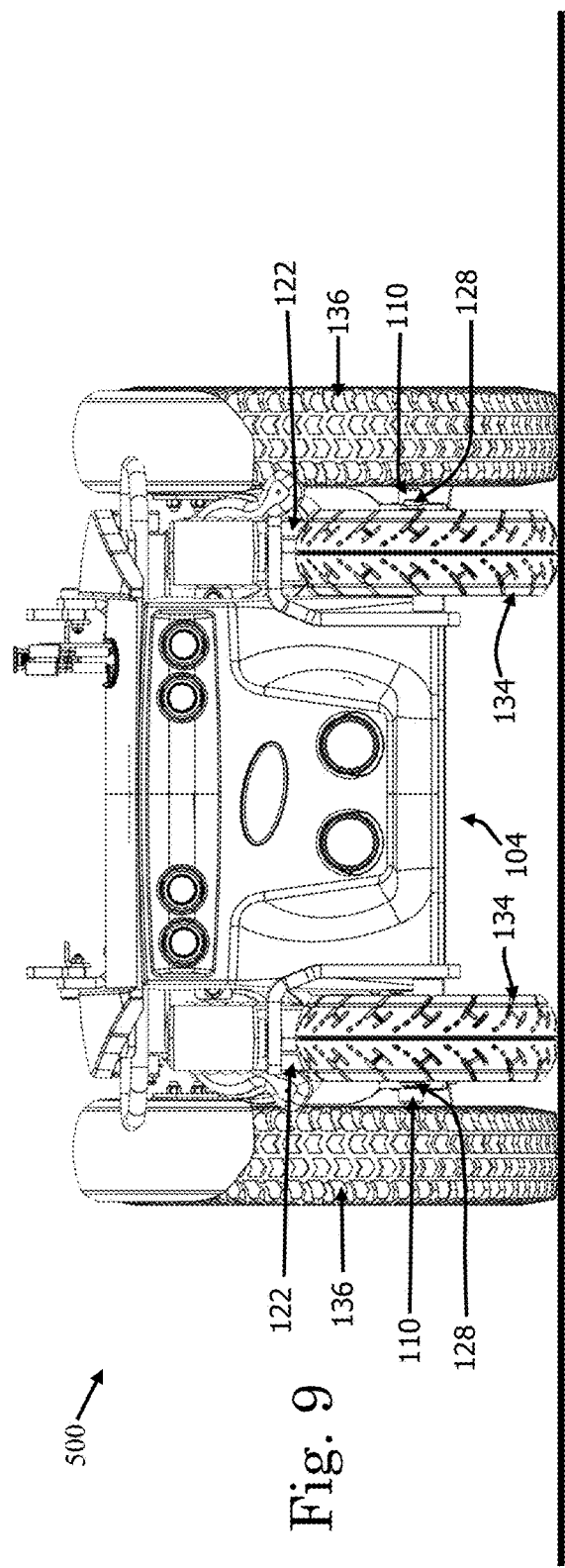
Figure 10:
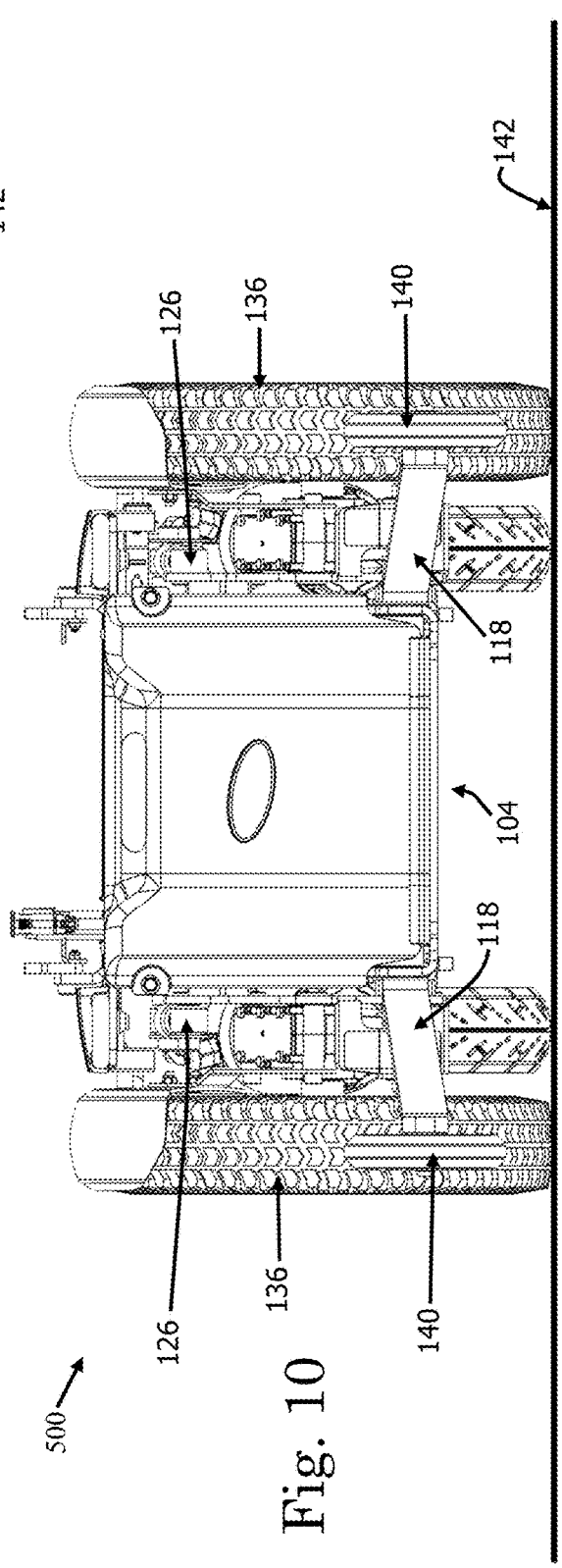

Referring now to FIGS. 1-4A, various embodiments of a power wheelchair and suspension system are shown. Only one side of the power wheelchair is illustrated with the understanding the other side is a mirror arrangement. FIG. 1 illustrates a wheelchair 100 having a seat (or seating system) 102 and a base frame 104. A suspension system 106 is shown connected to the base frame 104. The base frame 104 includes multiple pivot axes or pivot connections 108 and 110 to which the suspension system 106 is connected. In one embodiment, pivot connection 108 is an upper pivot connection and located proximate the upper portion of the base frame. Pivot connection 110 is a lower pivot connection and located proximate a lower portion of the base frame.

The precise locations of these pivot connections or axis is not critical. For example, lower pivot connection 110 can be located at or near the extreme lower edge or bottom plane of the base frame 104. In other embodiments, lower pivot connection 110 can be located some distance upward (e.g., about 1 to 6 inches) from the extreme lower edge or bottom plane of base frame 104. Similarly, upper pivot connection 108 can be located at or near the extreme upper edge or upper plane of base frame 104. In other embodiments, upper pivot connection 108 can be located some distance downward (e.g., about 1 to 6 inches) from the extreme upper edge or bottom plane of base frame 104.

Still referring to FIG. 1, the suspension system 106 includes first and second links 114 and 116. Link 114 is an upper pivoting link and connected to base frame 104 via upper pivot connection 108. So connected, link 114 can pivot about upper pivot connection 108, as schematically represented by arrows 118. Link 116 is a lower pivoting link and connected to base frame 104 via lower pivot connection 110. So connected, link 116 can pivot about lower pivot connection 110, as schematically represented by arrows 120.

Links 114 and 116 each include a body and can take the form of various shapes, components, and arrangements. In the embodiment shown, each link 114 and 116 includes a pivot connection or axes such as 126 and 128, respectively.

These pivot connections are used to connect a drive assembly to the suspension system 106. The drive assembly includes a mount or mounting arrangement 124. Mount 124 is movably or pivotably connected to links 114 and 116. This connection is made via pivot connections 126 and 128. So arranged, the drive assembly is mounted to base frame 104 via at least two pivot connections or axes (e.g., 108 and 110) or via multiple pivot connections or axes (126 and 108, respectively, and 128 and 110, respectively). The drive assembly typically includes a drive system having an electric motor connected to a gearbox (or, alternatively, an electric gearless and brushless motor (e.g., a wheel hub motor)). The gearbox connects to a drive axis or shaft 141 of a main drive wheel 136.

Link 116 may be an extension of or connected to another link 122 to which a rear caster wheel 134 is connected. A front wheel 140 arranged as an anti-tip wheel is connected to base frame 104 via link 138. In the embodiment shown, front anti-tip wheel 140 is suspended above the ground or normal horizontal supporting surface 142 of the wheelchair. Link 138 can be connected to base frame 104 via a rigid connection or a suspension system that can include a pivot connection or axis, which may be cushioned from impacts by a resilient member (e.g., see FIG. 12). Typically, two anti-tip wheels 140 are provided near the left and right sides of the front of base frame 104.

In the case of an FWD power wheelchair configuration, the center of gravity 144 of the wheelchair 100 and a user is generally horizontally offset very little (if any) from lower pivot connection 110 to distribute the combined load or weight between main drive wheel 136 and rear castor wheel 134. So arranged, main drive wheel 136 and rear castor wheel 134 are substantially ground engaging even over rough terrain. Horizontally offsetting center of gravity 144 from lower pivot connection 110 biases the tipping behavior of the base frame in the offset direction. The amount of biasing can be determined based on the desired base frame and suspension system behavior under weight-bearing conditions. For example, it may be desirable to slightly bias the center of gravity 144 (and base frame 104 center of gravity) rearward slightly rearward of pivot connection 110 so that anti-tip wheels 140 can more easily pivot or rotate the front portion of base frame 104 upwards when encountering a large obstacle (such as a curb or elevated sidewalk).

Referring now to FIG. 2, a wheelchair 200 having a suspension system similar that of FIG. 1 is shown. In FIG. 2, upper link 114 includes a resilient member 202. Resilient member 202 can take the form of various embodiments including a shock absorber, spring, spring and shock absorber, gas cylinder, lockable gas cylinder, an elastomeric body, etc., and combinations thereof. Resilient member 202 can perform various functions including, for example, absorbing impacts when drive wheel 136 encounters a large obstacle, very rough terrain, or elevated terrain. In such a situation, resilient member 202 absorbs the impact by compressing thereby not allowing the force of the impact to transfer to the base frame 104.

Resilient member 202 can also act as an extendable member allowing drive assembly 124 to pivot away from base frame 104 via pivot connection 128 and or pivot connection 110. This allows drive wheel 136 to maintain contact with variable terrain that includes terrain that may be lower than the terrain contacting the other drive wheel and/or rear caster wheels of the wheelchair. Such example includes when power wheelchair 100 is coming off an elevated surface, like an elevated sidewalk, berm and the like. Resilient member 202 can also act as a retractable member allowing drive assembly 124 to pivot into base frame 104 via pivot connection 128. This allows drive wheel 136 to maintain contact with variable terrain that includes terrain that may be higher than the terrain contacting the other drive wheel and/or rear caster wheels.

Referring now to FIG. 3, a wheelchair 300 having a suspension system similar that of FIGS. 1 and 2 is shown. In FIG. 3, suspension system 106 includes a further resilient member 302. Resilient member 302 can take the form of various embodiments including a shock absorber, spring, spring and shock absorber, gas cylinder, lockable gas cylinder, an elastomeric body, etc., and combinations thereof. Member 302 is located between base frame 104 and link 122. So arranged, member 302 can perform various functions including biasing link 122 towards the ground by distributing a portion of the wheelchair weight thereon, allowing link 122 to pivot about lower pivot connection 110 under bias pressure of the weight of base frame 104, cushioning or dampening movement (e.g., tipping) of base frame 104 against link 122, limiting movement (e.g., tipping) of base frame 104, etc. and combinations of the foregoing.

FIGS. 4A-4C illustrate the wheelchair behavior when traversing rough terrain or an obstacle such as, for example, a curb, berm, or elevated surface like a sidewalk. In FIG. 4A, the wheelchair approaches an elevated surface 400, which can be, for example, rough terrain, a large obstacle, or an elevated sidewalk. Front anti-tip wheel 140 makes initial contact with surface 400, which may be slightly cushioned if link 138 is connected to base frame 104 via a suspension having a resilient or compressible member. As the wheelchair continues to drive forward, anti-tip wheel 140 causes the front portion of base frame 104 to raise by rotating base frame 104 about lower pivot connection 110 (as indicated by arrow 402) as anti-tip wheel 140 drives itself onto the top of surface 400. Drive wheel 136 and rear castor wheel 134 maintain engagement with the lower supporting surface 142.

Referring now to FIG. 4B, as the wheelchair continues to drive forward, drive wheel 136 encounters elevated surface 400. This encounter typically creates physical impact on drive wheel 136 which may be transferred to the base frame 104 and the user. Suspension system 106 reduces the effect of this physical impact by allowing drive assembly mount 124 to pivot about pivot connection 128 (as shown by arrow 406) into base frame 104. Resilient member 202 absorbs some or all of this physical impact by compressing or retracting (as shown by arrow 404) as drive assembly mount 124 pivots against it.

Referring now to FIG. 4C, as the wheelchair continues to drive forward, drive wheel 136 is driven over and onto elevated surface 400. During this sequence, drive assembly mount 124 rotates or pivots about pivot connection 128 (as shown by arrow 410) away from base frame 104. Resilient member 202 extends or returns to its normal decompressed state (as shown by arrow 408) as drive assembly mount 124 pivots away from it. Now with drive wheel 136 on elevated surface 400, the wheelchair can continue to drive forward whereby rear castor wheel 134 will be driven over and onto elevated surface 400.

So arranged, suspension system 106 provides drive assembly mount 124 with multiple pivot connections (e.g., upper pivot connections 108 and 126 and lower pivot connections 110 and 128) to base frame 104. These pivot connections allow drive assembly mount 124 to pivot, rotate, raise, and/or lower as necessary to traverse rough terrain and obstacles while maintaining traction therewith. The inclusion of resilient member 202 allows physical impacts on drive wheel 136 to be absorbed or softened from being transferred to base frame 104 where they would be felt by a user. As previously described, less than the four illustrated pivot connections can be used and resilient member 202 may be a rigid link or other component(s). Moreover, as shown and described in connection with FIG. 3, an additional resilient member 302 can be included as part of suspension system 106.

FIGS. 5-11 illustrate a more specific embodiment of a wheelchair 500 and suspension system. Wheelchair 500 is generally configured similar to the embodiments of FIGS. 1-4A previously discussed. Reference numbers from the embodiments of FIGS. 1-4A are used when referring to the same or similar general components, assemblies, and/or systems. Wheelchair 500 includes base frame 104 and suspension system 106. Left and right front anti-tip wheels 140 are connected to base frame 104 by link 138, which suspend the anti-tip wheels above the supporting surface 142 of the wheelchair (e.g., see FIGS. 7, 8, 10 and 11). Also, left and right drive wheels 136 and left and right rear castor wheels 140 are connected to base frame 140.

Figure 11:
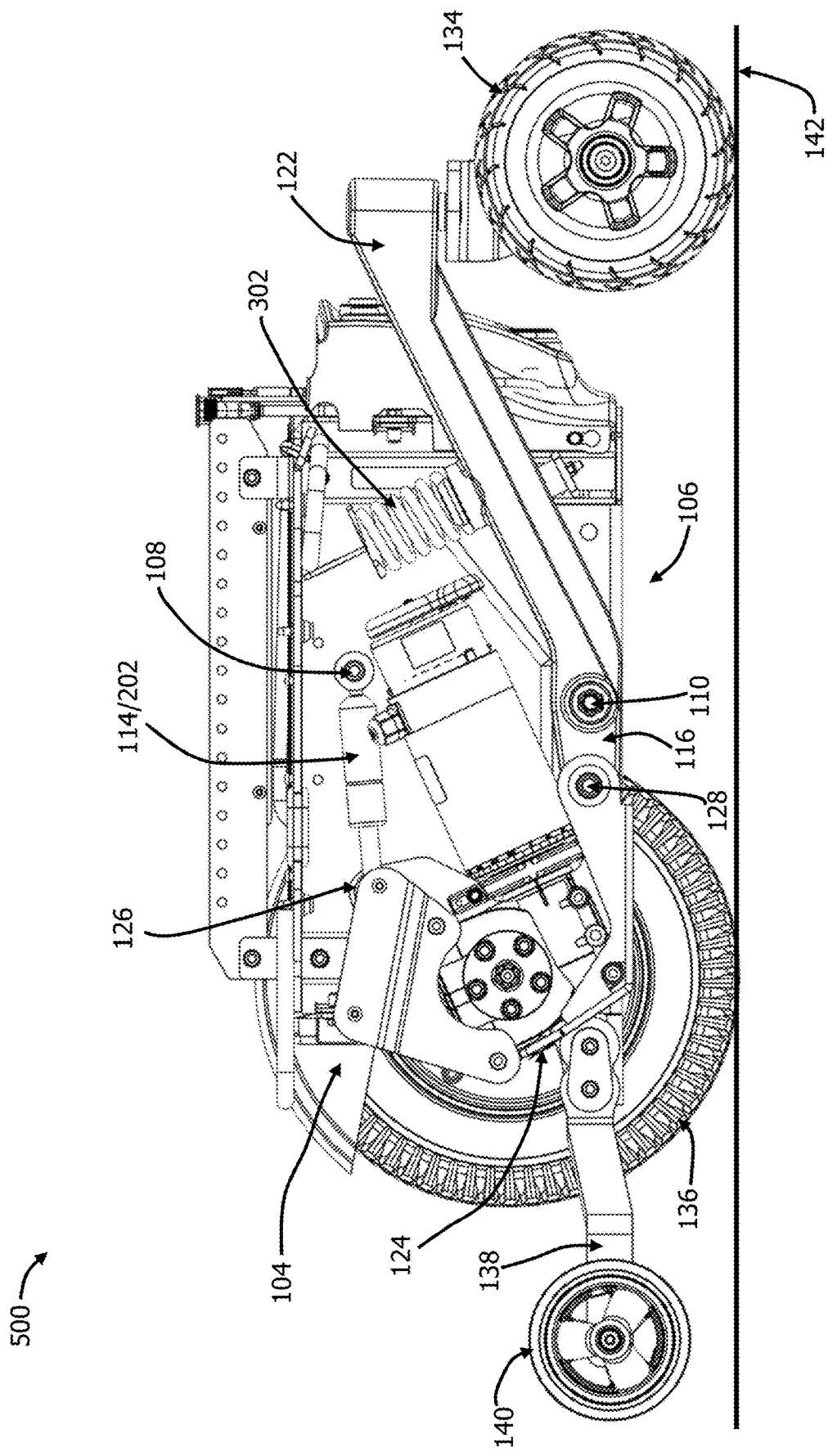

FIG. 11 shows a side elevational view with left drive wheel 136 removed for clarity. In the embodiment of wheelchair 500, upper pivot connections 108 and 126 and lower pivot connection 110 and 128 are shown. Also, link 114 is shown as resilient member 202 connecting drive assembly mount 124 to the base frame via upper pivot connections 108 and 126. Link 116 is shown connecting drive assembly mount 124 to base frame 104 via lower pivot connections 110 and 128. Wheelchair 500 further includes resilient member 302 acting between base frame 104 and link 122. Wheelchair 500 is configured as a front wheel drive (FWD) wheelchair. Wheelchair 500 via lower pivot connection 110 and resilient member 302 distribute the weight of wheelchair (and user) onto drive wheels 136 and rear castor wheels 134 so they are substantially in constant contact with the ground or terrain (i.e., drive wheels 136 and read castor wheels 134 are substantially weight-bearing). Front anti-tip wheels 140 are shown suspended above the normal horizontal supporting surface 142 of the wheelchair in order to facilitate traversing obstacles or rough terrain as exemplified by FIGS. 4A-C and the associated text.

Figure 12:
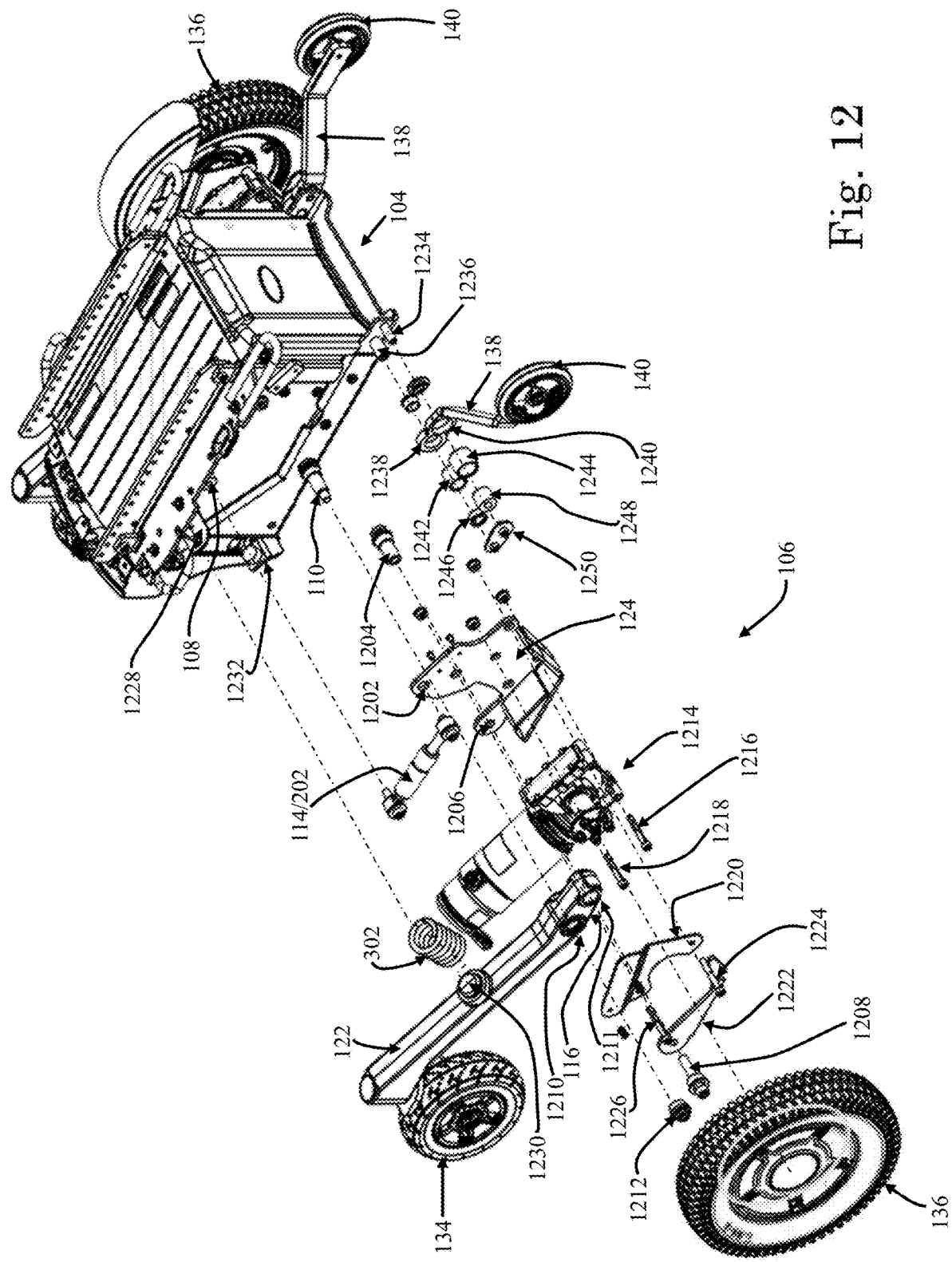
FIG. 12 illustrates an exploded perspective view of the suspension system embodiment shown FIGS. 5-11.

FIG. 12 is an exploded perspective view of one side of the embodiment of wheelchair 500 showing the components of suspension system 106. Links 116 and 122 form the body of a pivot arm that is secured to pivot connection 110 via through hole 1210 and fastener 1212. Fasteners as used herein may take a plurality of forms including screws, bolts, nuts, threads, sleeves, washers, bearings, spacers, etc., and combinations of the foregoing. So joined, links 116 and 122 can pivot about pivot connection 110. Base frame 104 can also pivot about connection 110 with respect to links 116 and 122 such as, for example, when front anti-tip wheels 140 encounter a large obstacle.

Link 122 also includes a contact area 1230 for contacting one end of resilient member 302. Base frame 104 also includes a contact area 1228 for contacting the other end of resilient member 302. In this manner, resilient member 302 acts between link 122 and base frame 104. As shown, resilient member 302 is a coil spring and contact area 1230 is circular allowing the coil spring to seat or nest thereon. Contact area 1228 on base frame 104 can be similarly arranged. Base frame 104 includes a further contact area 1232 that can act as a physical stop feature limiting the amount of upward movement of the rear portion of base frame 104. Contact area 1232, which may include a resilient member, is arranged to make selective contact with the underside of link 122. Other contact area arrangements are also possible including flat or planar contact areas and those formed to seat or nest the resilient member 302.

Link 116 extends from link 122 as shown and includes through hole 1211. Through hole 1211 is used to form a lower pivot connection (i.e., pivot connection 128) between drive assembly mount 124 (including sub-mount 1222) and links 116 and 122 (e.g., forming the rear castor wheel pivot arm). Fasteners (e.g., 1204 and 1208) and mounting holes (e.g., 1206) are used in this embodiment to complete the pivot connection.

An upper pivot connection (i.e., pivot connection 126) is formed between the drive assembly mount 124 and link 114 shown as resilient member 202. One end of resilient member 202 is fastened to aperture 1202 in drive assembly mount 124. The other end of resilient member 202 is pivotably joined to base frame 104 to form a pivot connection (i.e., upper pivot connection at 108.)

A drive system 1214 can include a motor and gearbox and is joined to drive assembly mount 124. Further sub-mounts 1220 and 1222 can be included to provide additional structural support and protection to the drive system 1214. These components are collectively joined together via fasteners (e.g., 1216, 1218, 1224, and 1226).

Still referring to FIG. 12, front anti-tip wheels 140 are connected in this embodiment to base frame 104 via a suspension assembly. Suspension assembly includes link 138 having adjacent through holes 1238 and 1240. Through hole 1238 is mounted to pivot connection 1236 via fasteners 1242, 1246, and 1250. Through hole 1240 includes resilient member 1248 and receives post 1234 therein. Fasteners 1250 and 1244 secure the connection. Link 138 is permitted a range of pivotal motion (e.g., pivoting upward) around pivot connection 1236 that is limited by post 1236 acting against resilient member 1248. Resilient member 1248 can be, in one embodiment, an elastomeric cylinder receiving post 1236 therein.

FIGS. 13 and 14 illustrate perspective and elevational views of suspension system 106 with the drive motor and gearbox components not shown. As previously described, the suspension system includes multiple pivot connections including upper pivot connections 108 and 126 and lower pivot connections 110 and 128. Upper pivot connection 108 and lower pivot connection 110 are connected to base frame 104. Upper pivot connection 108 allows link 114 (resilient member 202) to move or pivot as indicated by arrows 118. Lower pivot connection 110 allows the pivot arm formed by links 116 and 122 to move or pivot as indicated by arrows 120. Upper pivot connection 126 and lower pivot connection 128 connect links 114 and 116 to drive assembly mount 124. This allows drive assembly mount 124 to move or pivot as indicated by arrows 130 and 132.

Link 114 includes a body having first and second end portions and wherein the first end portion is connected to drive assembly mount 124 to form pivot connection 126. The second end portion of link 114 body is connected to the base frame 104 forming pivot connection 108. As shown, link 114 body may include a resilient element 202 such as, for example, a shock absorber, spring, etc. Links 116 and 122 form a pivot arm body having first and second end portions and wherein the first end portion is connected to the drive assembly mount 124 thereby forming pivot connection 128. The pivot arm body is also connected between its end portions to base frame 104 thereby forming pivot connection 110.

As previously described, resilient member 202 can extend and retract and can be a shock absorber. Resilient member 202 retracts under shock force to cushion impacts from jarring base frame 104. Resilient member 202 extends back to its normal position after the shock force has dissipated or passed. Hence, distance D2 represents the length of link 114 and can vary through this shock absorbing function. Distance D2 can also dynamically vary to accommodate changing levels of elevation or terrain to allow for continued ground engagement by drive wheels 136. In this situation, distance D2 grows and shrinks as drive wheel 136 travels over bumps, steps, and the like. Distance D1 represents the distance between lower pivot connections 110 and 128. In the embodiment shown, distance D1 is less than distance D2. The amount by which distance D1 is less than D2 can vary based on the amount of desired mechanical advantage to be applied during pivoting movement of the pivot arm.

Figure 15:
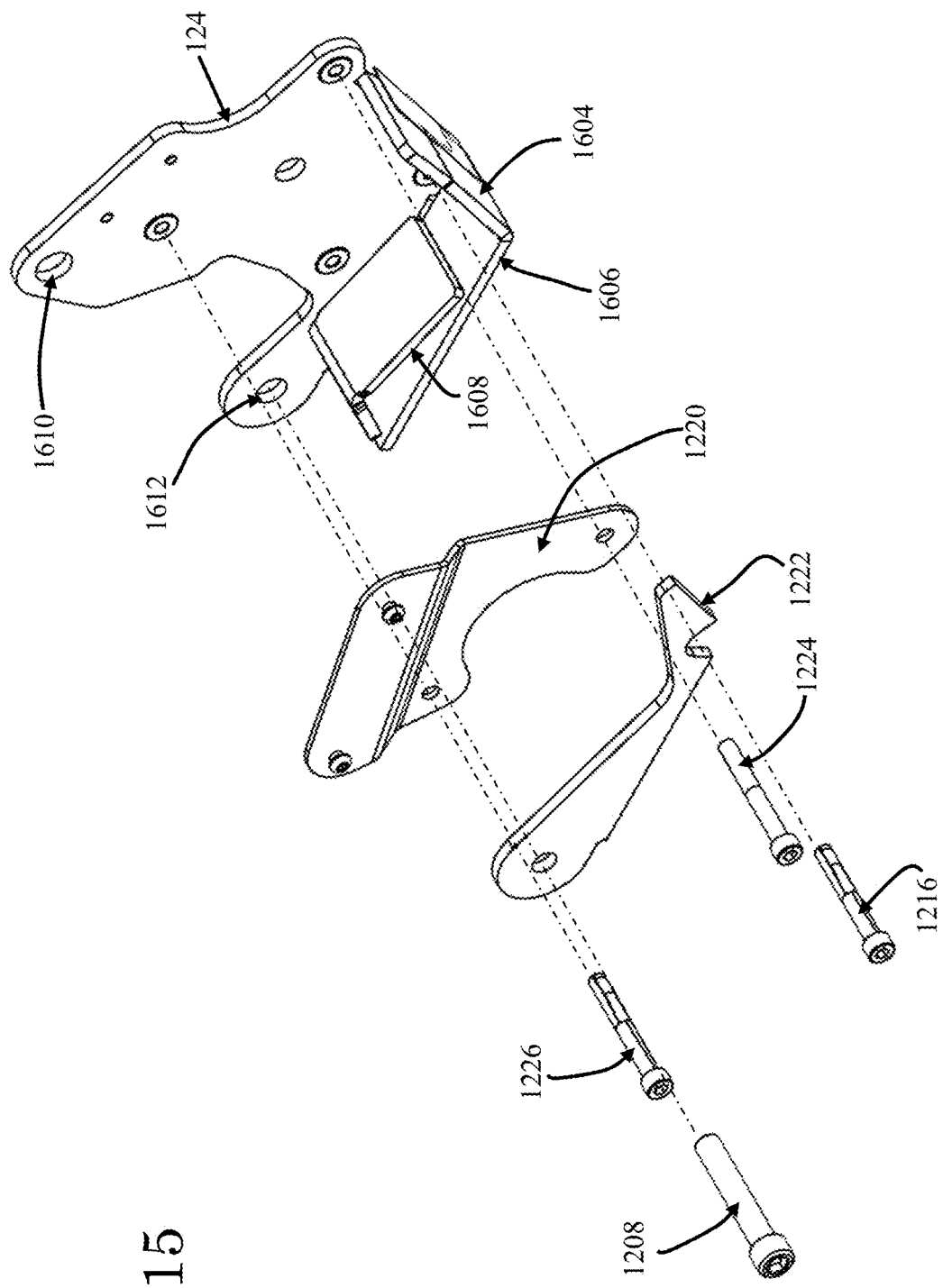
FIG. 15-17 are various views of one embodiment of drive assembly components.
Figure 16:
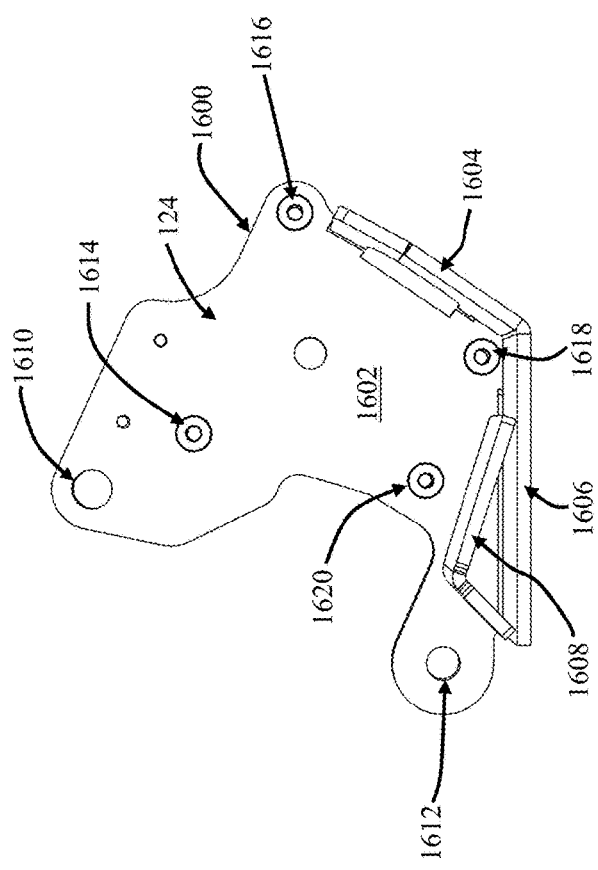

Referring now to FIGS. 15 and 16, one embodiment of a drive assembly mount 124 and optional sub-mounts 1220 and 1222 are illustrated. Drive assembly mount 124 includes a body having an upper portion with aperture 1610 and a lower portion with aperture 1612. Upper aperture 1610 connects drive assembly mount 124 to link 114. Lower aperture 1612 connects drive assembly mount 124 to link 116. Drive assembly mount 124 also includes support 1608 for supporting and positioning the motor and gearbox combination within space 1602 of drive assembly mount 124. Apertures 1614, 1616, 1618, and 1620 are provided for fastening the motor and gearbox combination (and optional sub-mounts 1220 and 1222) to drive assembly mount 124. Drive assembly mount 124 also includes protective walls 1604 and 1606 that protect the motor and gearbox combination from direct impacts by foreign objects, terrain and/or obstacles.

Figure 17:
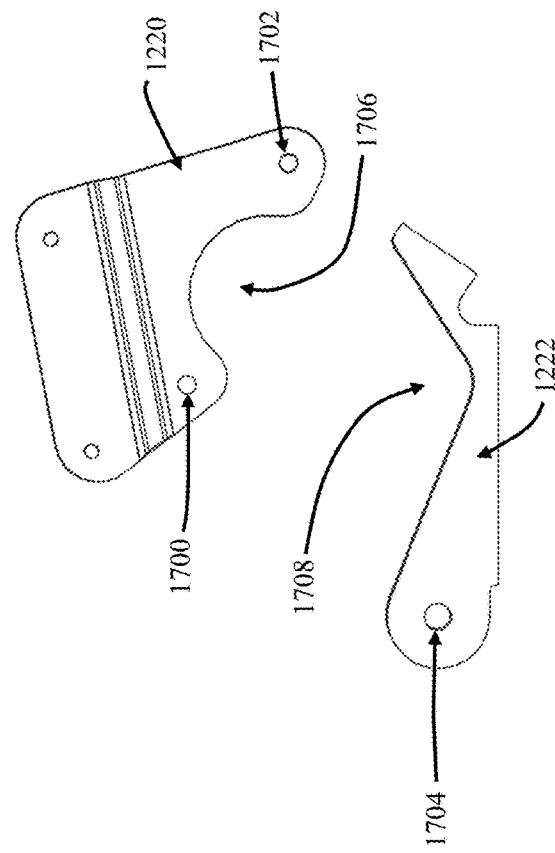

FIGS. 15 and 17 illustrate optional sub-mounts 1220 and 1222. These sub-mounts include spaces or recesses 1706 and 1706 to allow drive components such as a drive shaft to extend from the motor and gearbox combination to a drive wheel. So arranged, sub-mounts 1220 and 1222 also provide lateral protection from impacts and foreign objects. Apertures 1700 and 1702 are used to fasten sub-mount 1220 to drive assembly mount 124. Sub-mount 1222 can also be joined to drive assembly mount 124 via welding or formed integral therewith to provide a strong connection or integral body connection.

Figure 18:
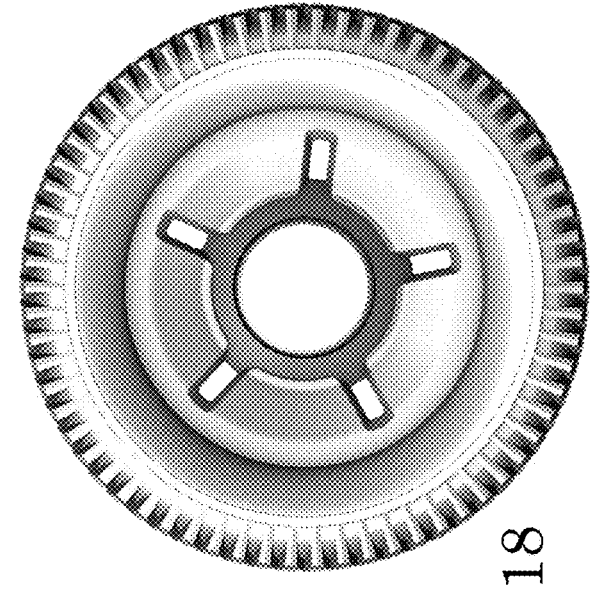
FIGS. 18-22 illustrate various views and embodiments of an ornamental design for a hub and wheel hub combination.
Figure 19:
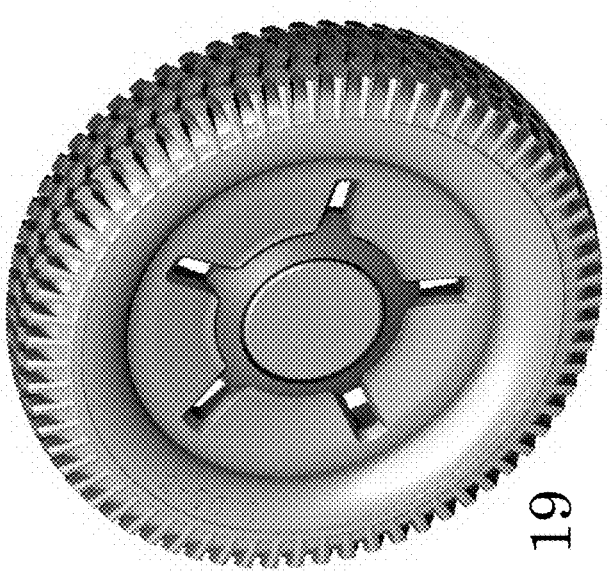
Figure 20:
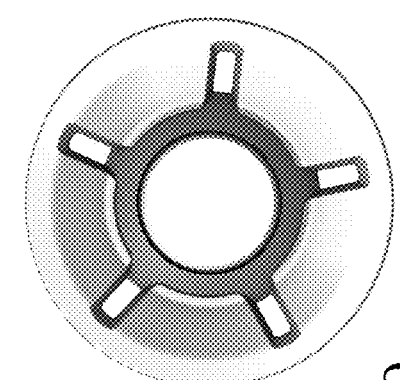
Figure 21:
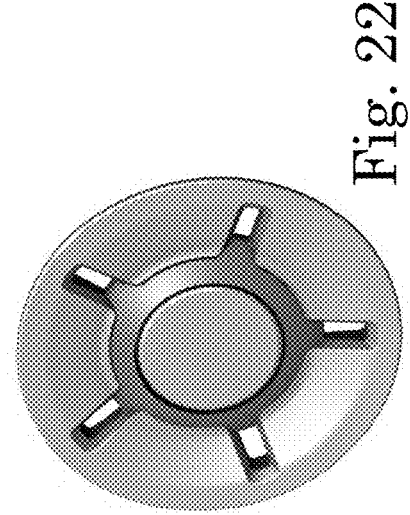
Figure 22:
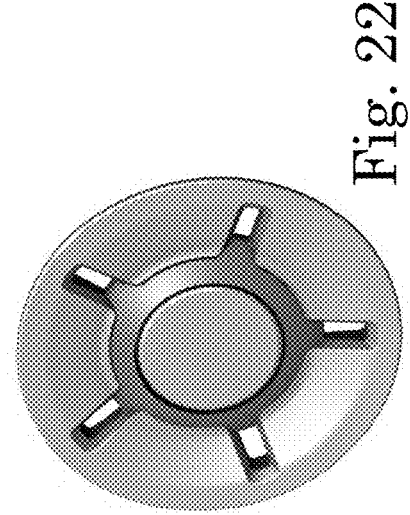

FIGS. 18 and 19 illustrate a design for one embodiment of a hub for a wheel including, for example, drive wheel 136. FIGS. 20-22 illustrate the design for one embodiment of just the hub without the wheel. While the entire hub design has been shown, other components can stand alone as designs including the five-point (or star or spoke) pattern originating from the central circular area of the hub.

Figure 24:
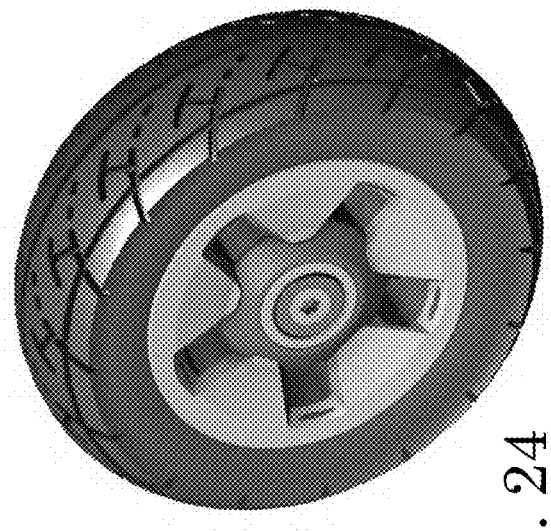
FIGS. 23-27 illustrate various views and embodiments of an ornamental design for a hub and wheel hub combination.
Figure 27:
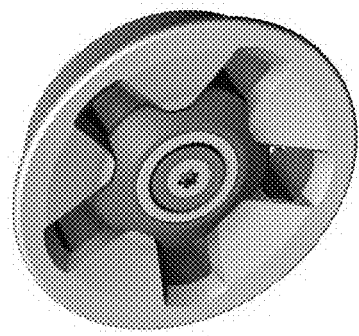
Figure 26:
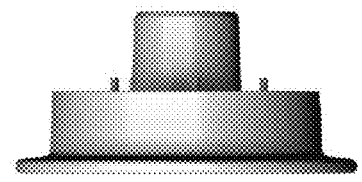
Figure 23:
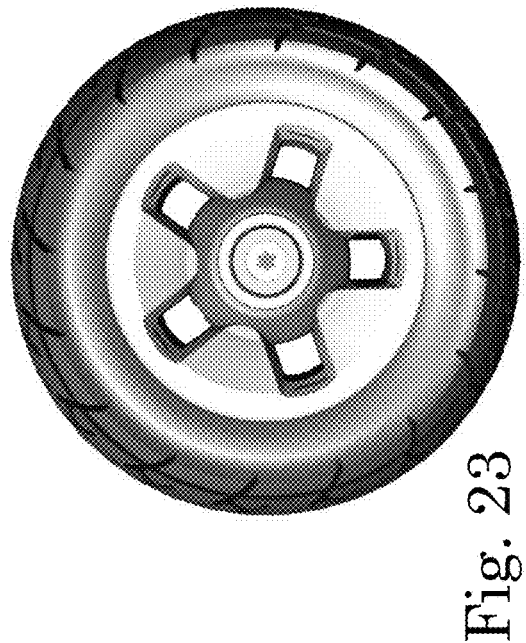
Figure 25:
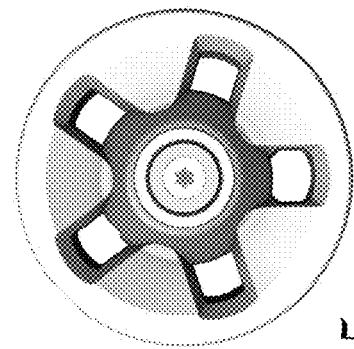

FIGS. 23 and 24 illustrate a design for another embodiment of a hub for a wheel including, for example, rear castor wheels 134. FIGS. 25-27 illustrate the design for one embodiment of just this hub without the wheel. While the entire hub design has been shown, other components can stand alone as designs including the five-point (or star or spoke) pattern originating from the central circular area of the hub.

In the ornamental embodiments of FIGS. 18-27, the surface topologies (e.g., convex, concave, combinations thereof, etc.) of the designs can be varied and are not critical to the illustrated ornamentally, nor are the relative proportions of the respective design features and components. Other ornamental design embodiments including varying design component size and proportions are within the scope of the disclosure herein.

While the present inventions and designs have been illustrated by the description of embodiments thereof, and while the embodiments have been described in considerable detail, it is not the intention of the descriptions to restrict or in any way limit the scope of the appended claims to such detail. Additional advantages and modifications will readily appear to those skilled in the art. Therefore, the inventions and designs, in broader aspects, are not limited to the specific details, the representative apparatus, and illustrative examples shown and described. Accordingly, departures can be made from such details without departing from the spirit or scope of the general inventive concepts.

What is claimed:

1. A wheelchair comprising:
    a base frame having an upper pivot connection and a lower pivot connection;
    a drive assembly having first and second pivot connections;
    a plurality of links connecting the drive assembly to the base frame, the plurality of links including:
        a first pivoting link connecting the drive assembly first pivot connection to the base frame upper pivot connection; and
        a second pivoting link connecting the drive assembly second pivot connection to the base frame lower pivot connection;
    wherein the second link comprises a body having first and second end portions and wherein the body is connected to the base frame lower pivot connection at a portion between the first and second end portions.

2. The wheelchair of claim 1 wherein the first link comprises a body having first and second end portions and wherein the first end portion is connected to the drive assembly first pivot connection.

3. The wheelchair of claim 2 wherein the second end portion of the first link body is connected to the base frame upper pivot connection.

4. The wheelchair of claim 1 wherein the first link comprises a body having a shock absorber.

5. The wheelchair of claim 1 wherein the first link comprises a body having a resilient member.

6. The wheelchair of claim 1 wherein the first link comprises a body having a spring and shock absorber.

7. The wheelchair of claim 1 wherein the second link comprises a body having first and second end portions and wherein the first end portion is connected to the drive assembly second pivot connection.

8. The wheelchair of claim 1 wherein the drive assembly comprises a body having upper and lower portions and wherein the upper portion is connected to the first pivoting link.

9. The wheelchair of claim 1 wherein the drive assembly comprises a body having upper and lower portions and wherein the lower portion is connected to the second pivoting link.

10. The wheelchair of claim 1 wherein the drive assembly comprises a body having upper and lower portions and wherein the upper portion is connected to the first pivoting link and the lower portion is connected to the second pivoting link.

11. The wheelchair of claim 1 wherein the second pivoting link comprises a body that extends rearwardly of the base frame.

12. The wheelchair of claim 1 wherein the second pivoting link comprises a body that extends rearwardly of the base frame and connects to a rear castor wheel.

13. The wheelchair of claim 1 wherein the second pivoting link comprises a body having first, second and third portions, and wherein the first portion connects to the drive assembly, the second portion connects to the base frame lower pivot connection, and the third portion connects to a rear castor wheel.

14. The wheelchair of claim 1 wherein the drive assembly comprises a mounting body having upper and lower portions and wherein the upper portion comprise the drive assembly first pivot connection and the lower portion comprises the drive assembly second pivot connection.

15. A wheelchair comprising:
- a base frame having an upper pivot connection and a lower pivot connection;
- a drive assembly having first and second pivot connections, the first pivot connection connected to the base frame upper pivot connection; and
- a pivot arm connected to the base frame lower pivot connection and the drive assembly second pivot connection;

wherein the pivot arm is connected to a rear caster.

16. The wheelchair of claim 15 wherein the drive assembly first pivot connection is located above the drive assembly second pivot connection.

17. A wheelchair comprising:
- a base frame having an upper pivot axis and a lower pivot axis;
- a pivot arm connected to the base frame lower pivot axis; and
- a drive assembly connected to the base frame upper pivot axis by a link and connected to the pivot arm, wherein the drive assembly pivots about the pivot arm connection and pivots about the base frame upper pivot axis via the link;

wherein the pivot arm is connected to a rear caster.

18. The wheelchair of claim 17 wherein the link comprises a resilient member.

* * * * *